(12) United States Patent
Cho

(10) Patent No.: US 10,837,421 B2
(45) Date of Patent: Nov. 17, 2020

(54) TIDAL CURRENT POWER GENERATOR

(71) Applicant: Yong Soo Cho, Changwon (KR)

(72) Inventor: Yong Soo Cho, Changwon (KR)

(73) Assignee: Yong Soo Cho, Changwon ( * ) Notice: Subject to any disclaimer, the term of this patent is extended or adjusted under 35 U.S.C. 154(b) by 74 days.

(21) Appl. No.: 16/030,747

(22) Filed: Jul. 9, 2018

(65) Prior Publication Data

US 2019/0017490 A1 Jan. 17, 2019

Related U.S. Application Data

(60) Provisional application No. 62/532,326, filed on Jul. 13, 2017.

(51) Int. Cl.
 *F03B 13/26* (2006.01)
(52) U.S. Cl.
 CPC .......... *F03B 13/262* (2013.01); *F03B 13/264* (2013.01)
(58) Field of Classification Search
 CPC .............................. F03B 13/264; F03B 13/262
 USPC ......................................... 290/42, 43, 53, 54
 See application file for complete search history.

(56) References Cited

U.S. PATENT DOCUMENTS

| | | | | |
|---|---|---|---|---|
| 1,407,623 A * | 2/1922 | Baehn | ................... | F03B 13/262 415/7 |
| 1,847,855 A * | 3/1932 | Young | ................... | F03B 13/264 415/5 |
| 3,887,817 A * | 6/1975 | Steelman | .............. | F03B 13/264 290/43 |
| 8,344,540 B2 * | 1/2013 | Kim | ....................... | B63H 21/20 290/53 |
| 2011/0169266 A1 * | 7/2011 | Song | ................... | F03B 13/1825 290/53 |
| 2011/0265684 A1 * | 11/2011 | Knight | ................. | B61D 39/001 105/377.06 |
| 2012/0104761 A1 * | 5/2012 | Vamvas | .................. | F03B 13/16 290/53 |
| 2015/0285210 A1 * | 10/2015 | Sieber | .................. | F03B 13/264 60/499 |

(Continued)

FOREIGN PATENT DOCUMENTS

| | | |
|---|---|---|
| JP | 2003-13834 | 1/2003 |
| JP | 2004-138015 | 5/2004 |
| JP | 2013-64393 | 4/2013 |

(Continued)

*Primary Examiner* — Charles Reid, Jr.
(74) *Attorney, Agent, or Firm* — H.C. Park & Associates, PLC

(57) ABSTRACT

The disclosure defined by this invention provide a tidal current power generator capable of maximizing the force, which is generated by tidal current flows, through changing operating direction itself without any manual operation when water flow direction is changed. According to an exemplary embodiment, a tidal current power generator includes a main frame; a plurality of operating bodies; a plurality of power plates configured to forcibly move the plurality of operating bodies in the direction of the tidal current by the force of the tidal current; a pair of clutch jaws engaged with or spaced from each other by axial movement of an outer pipe; a locking part configured to move the outer pipe so that each of the clutch jaws is engaged with each other; and a release part configured to move the outer pipe so that each of the clutch jaws is spaced apart from each other.

16 Claims, 24 Drawing Sheets

(56) References Cited

U.S. PATENT DOCUMENTS

2016/0237984 A1\* 8/2016 Hashimoto ........... F03B 13/264

FOREIGN PATENT DOCUMENTS

| KR | 10-1020569 | 3/2011 |
| KR | 10-1030036 | 4/2011 |
| KR | 10-1089667 | 12/2011 |
| KR | 10-2013-0124731 | 11/2013 |

\* cited by examiner

TIDAL CURRENT POWER GENERATOR

CROSS-REFERENCE TO RELATED APPLICATION

This application claims the benefit of U.S. Provisional Patent Application No. 62/532,326, filed on Jul. 13, 2017, which is hereby incorporated by reference for all purposes as if fully set forth herein.

BACKGROUND

Field

Exemplary embodiments of the invention relate generally to a tidal current power generator and, more specifically, to a tidal current power generator capable of maximizing the force, which is generated by tidal current flows, through changing operating direction itself.

Discussion of the Background

In General, Usually, the power plant converts other energy sources such as mechanical energy, thermal energy, and chemical energy into electricity.

Among such power generation devices and systems, many researches and developments about power generation system using hydro, wind, and solar power have been made and applied because those generating systems utilize natural energy sources.

In the case of typical tidal current power generation system, which is using the above-mentioned natural energy, building a breakwater and installing turbines in a bay or a river estuary to generate electricity.

When seawater comes in at high tide, it opens water gates and fills water in seawater. Then, when it becomes low tide, it opens water gates again and simultaneously discharges water. As a result, electricity is generated through spinning turbines by water forces.

However, the foregoing tidal current power generation system has problems that installation site is limited and cost of facilities is enormous. To solve these problems, various other type of tidal current or flow generation system which can utilize momentary water flows generated by discharging water has been researched and developed.

However, when water comes in the opposite direction of water discharge, those previous system or devices are not only disabling to generate electricity, but also disturb water flows.

The above information disclosed in this Background section is only for enhancement of understanding of the background of the inventive concepts and, therefore, it may contain information that does not constitute prior art.

SUMMARY

Exemplary embodiments provide a tidal current power generator capable of maximizing the force, which is generated by tidal current flows, through changing operating direction itself without any manual operation when water flow direction is changed.

Additional aspects will be set forth in part in the description which follows and, in part, will be apparent from the disclosure, or may be learned by practice of the inventive concepts.

According to an exemplary embodiment, a tidal current power generator includes a main frame including first and second sprockets rotated together with a chain and a guide rail for supporting the chain, the main frame being arranged in parallel with the direction of the tidal current of seawater; a plurality of operating bodies mounted on the chain and guided by the guide rails, the operating bodies including an inner shaft projecting to both sides of the outer surface and an outer pipe accommodating the inner shaft; a plurality of power plates combined with the outer pipe configured to forcibly move the plurality of operating bodies in the direction of the tidal current by the force of the tidal current; a pair of clutch jaws formed to face an inner circumferential surface of the outer pipe and the outer circumferential surface of the inner shaft and is engaged with or spaced from each other by axial movement of the outer pipe; a locking part configured to move the outer pipe so that each of the clutch jaws are engaged with each other; and a release part configured to move the outer pipe so that each of the clutch jaws are spaced apart from each other. The plurality of power plates are erected so as to be perpendicular to the direction of the tidal current when passing the first sprocket and the plurality of power plates are laid down so as to be parallel to the direction of the tidal current when passing the second sprocket.

The tidal current power generator may further include a generator configured to convert the rotational force of the first and second sprockets into electrical energy.

Each of the plurality of operating bodies may include a fixed part as a body member and a bending part bent at both sides of the fixed part, the bent parts includes a guide hole for receiving an end portion of the guide rails.

Each of the plurality of operating bodies may further include guide rollers, which rotate in contact with the upper and lower surfaces of the guide rails.

The locking part may include a lifting locking part to force the outer pipe to move to the inner shaft by rotation of the outer pipe so that the clutch jaws are engaged with each other.

The lifting locking part may include a plurality of stage parts having compression springs having different elastic modulus; the plurality of stage parts may be configured to lock the power plates in an erecting state by a restoring operation of the sequential compression springs.

A switch bump may be formed on the inner circumferential surface of the outer pipe, and an operation switch is provided in a first stage part of the plurality of stage parts, and when the operation switch may be pressed against the switch bump, the compression springs of the respective stages may be sequentially restored.

The compression spring provided in a last stage part of the plurality of stage parts may have a greater restoring force than the compression springs provided in the other stage parts.

The release part may include a first release part configured to separate the clutch jaw provided in the outer pipe of the power plate from the clutch jaw provided in the inner shaft of the operating body during the passage of the first sprocket while the power plate is erected, and a second release part configured to separate the clutch jaw provided in the outer pipe of the power plate, which is locked while passing through the first sprocket, from the clutch jaw provided on the inner shaft of the operating body.

A key groove may be formed on the outer circumferential surface of the inner shaft, and the locking part may include a tilting lock part including a locking bar sequentially passing through the outer pipe and a key protruded from an outer circumferential surface of the locking bar, the key is accommodated in the key groove of the inner shaft by a rotation operation of the outer pipe.

The first release part may include a first release slope positioned and tilted in the moving direction of the locking bar, and the locking bar may be gradually pressed by the first release slope when the operating body passes the first release slope, so that the key is released from the key groove of the inner shaft.

The second release part may include a release bar installed to penetrate the operating body, an interlocking link which pushes the outer pipe so that the clutch jaw of the outer pipe is separated from the clutch jaw of the inner shaft while being pressed by a lowering action of the release bar, and a second release slope formed at an oblique position of the guide rail and located on the moving direction side of the operating body to press the release bar of the operating body passing through the guide rails.

The tidal current power generator may further include a displacement roller provided on the guide rail for guiding the power plates to be forcibly raised while the bottom surface of the power plates passing through the first or second sprocket is in contact with the guide rail.

The tidal current power generator may further include a pinion gear provided on an outer peripheral surface of the outer pipe, and rack gears for forcibly rotating the pinion gear while being positioned at a position where the pinion gear passes.

The rack gears may be provided for each of the first and second sprockets, and when one of the rack gears is moved downward, the other rack gear is moved upwards. The guide rail may include a switch unit for moving the two rack gears in opposite directions in accordance with the flow direction of the tidal current.

The operating body may include an operating pointer to operate the switch unit, and the switch unit may include a switch board mounted on the guide rail and including a cut-off hole for passing through which the operation pointer passes, rotating shafts installed on both sides of the cut-off hole of the switch board, a rotation links coupled to each of the rotating shafts and rotated while being elastically operated by rotation of the rotating shafts, a barrier provided on each of the opposing faces of the rotation links and which is adjacent to each other when the rotation links are rotated in directions adjacent to each other, and a moving shaft for rotating the respective rotating shafts while being pressed in the moving direction of the operating body.

The operation pointer may include a first bump for forcibly pushing the moving shaft to rotate each rotating link and a second bump for pushing the barrier.

It is to be understood that both the foregoing general description and the following detailed description are exemplary and explanatory and are intended to provide further explanation of the invention as claimed.

BRIEF DESCRIPTION OF THE FIG.S

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
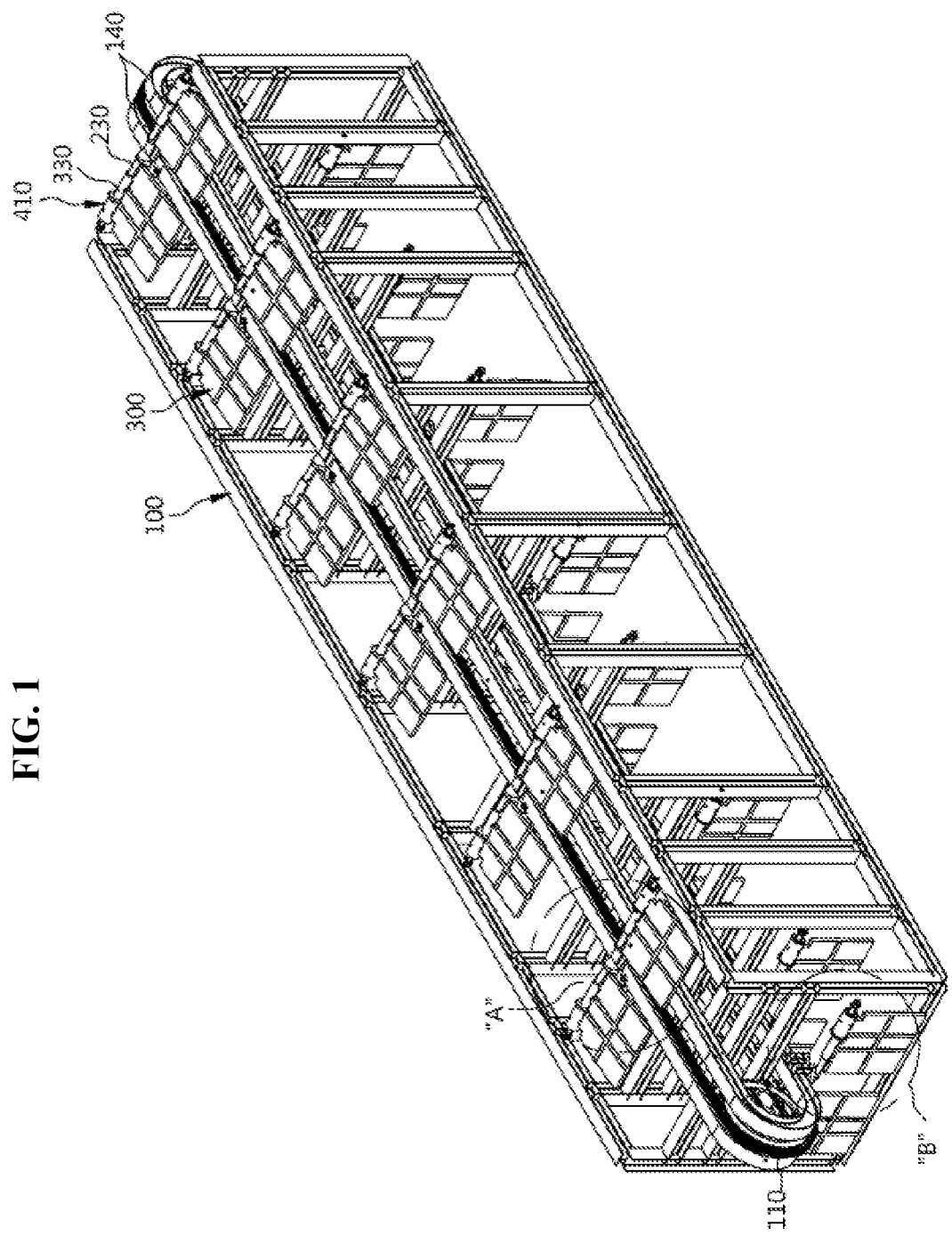
FIG. 1 is a perspective view of an exemplary embodiment of a tidal current power generator constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the FIG.s. Spatially relative terms are intended to encompass different orientations of an apparatus in use, operation, and/or manufacture in addition to the orientation depicted in the FIG.s. For example, if the apparatus in the FIG.s is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the preferred embodiments of the tidal current generator of the present invention will be described with reference to FIGS. 1 to 26.

Figure 2:
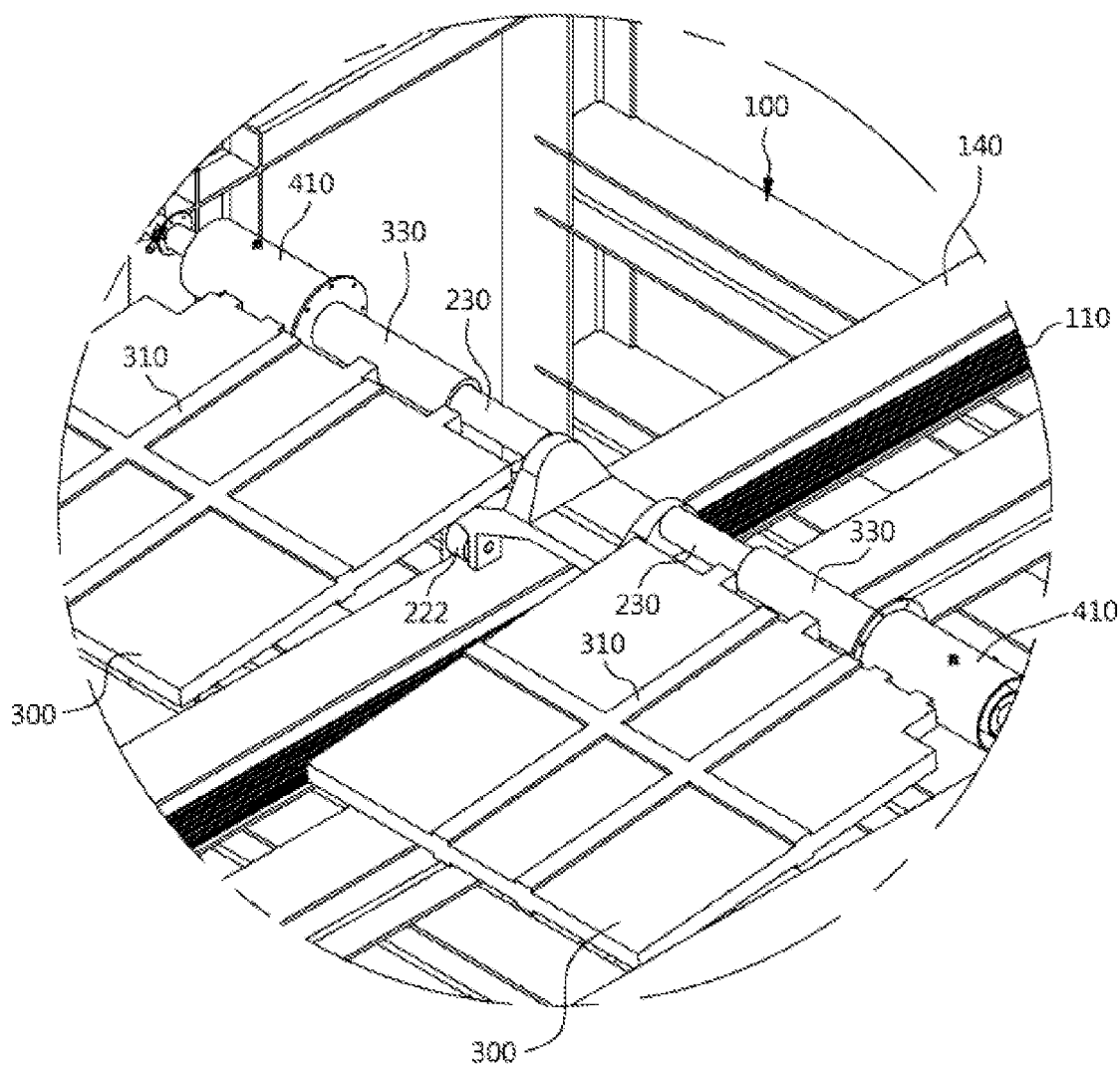
FIG. 2 is an expanded view of a specific region (A) of FIG. 1.
Figure 3:
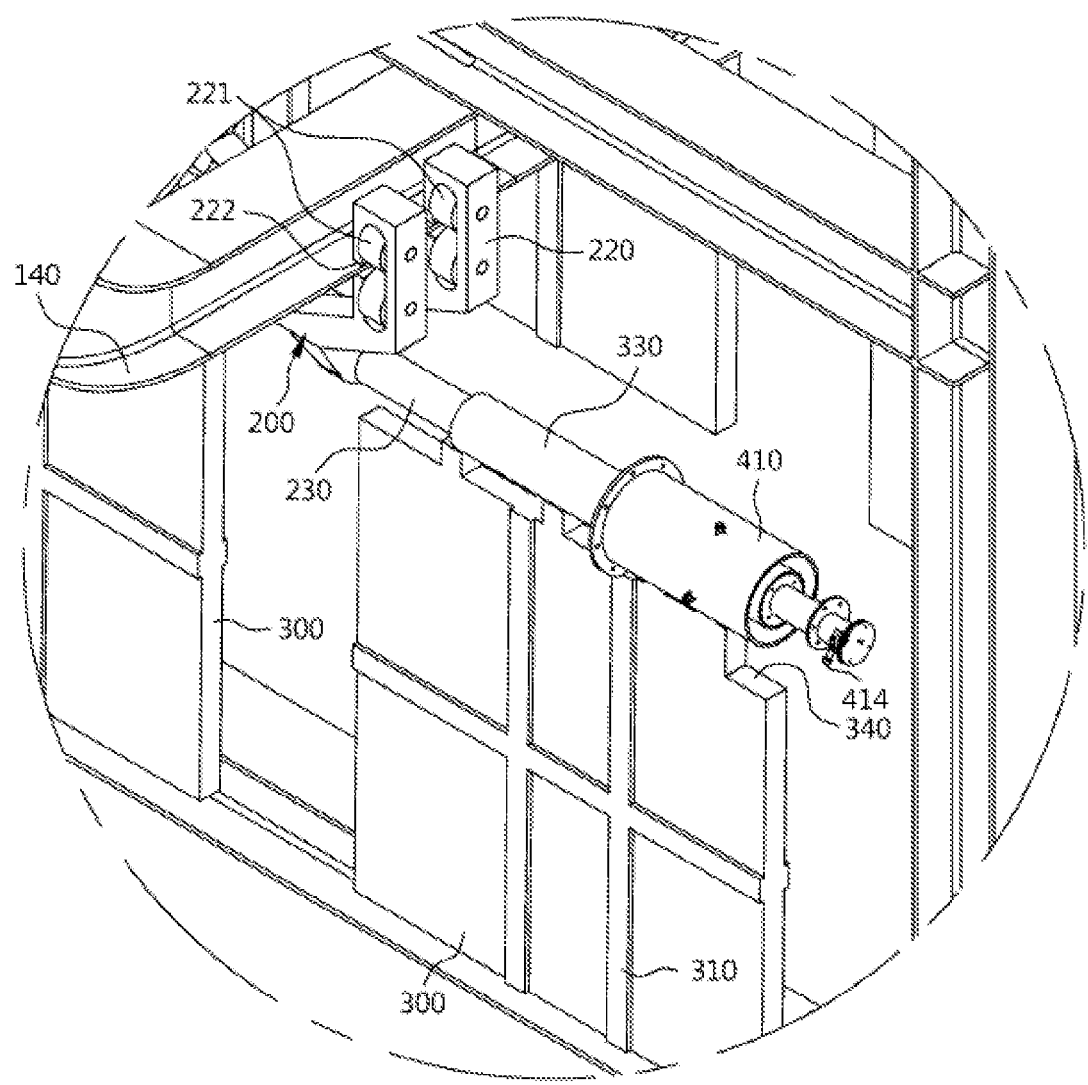
FIG. 3 is an expanded view of a specific region (B) of FIG. 1.
Figure 4:
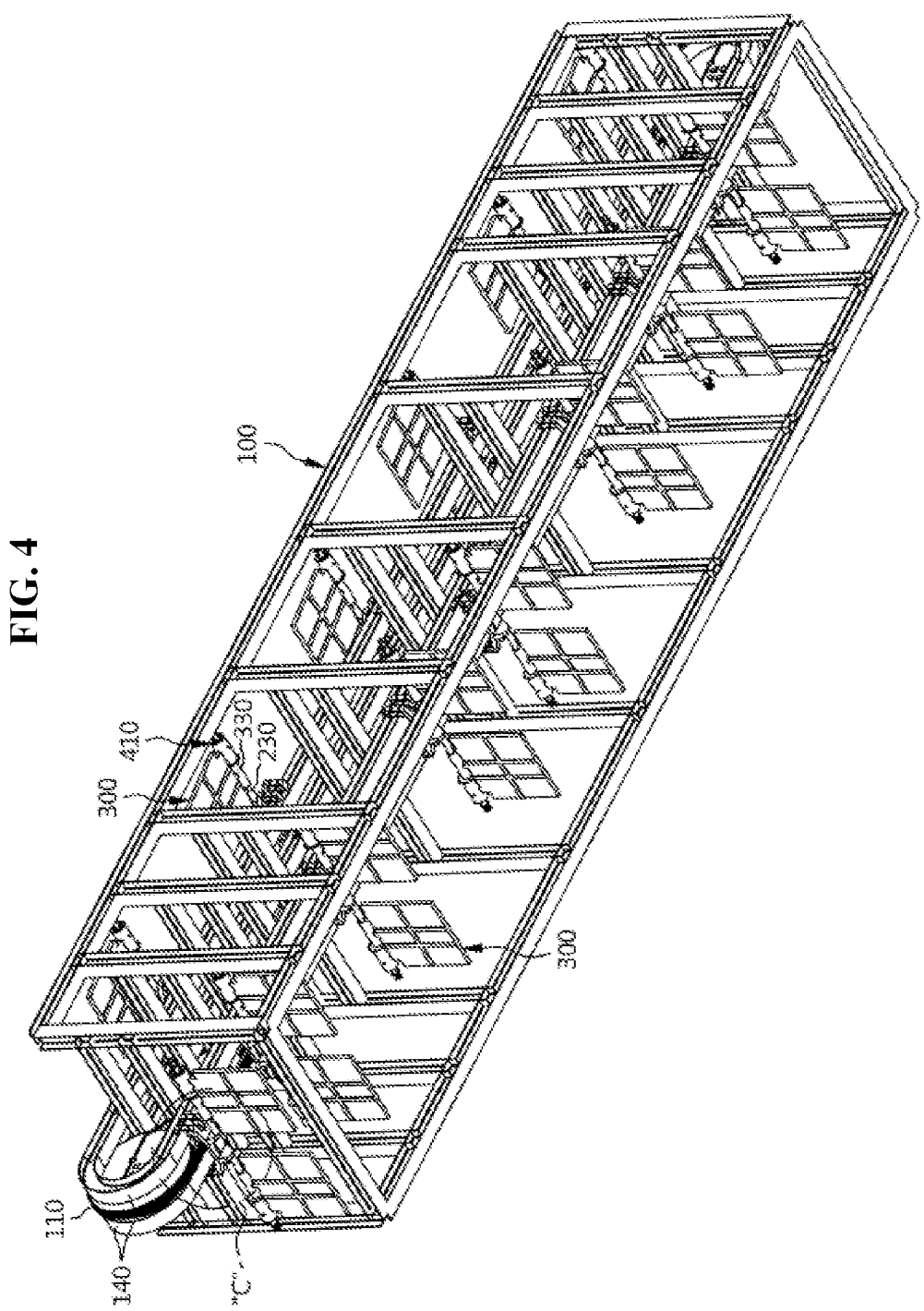
FIG. 4 is a bottom side perspective view of an exemplary embodiment of a tidal current power generator as shown in FIG. 1.
Figure 5:
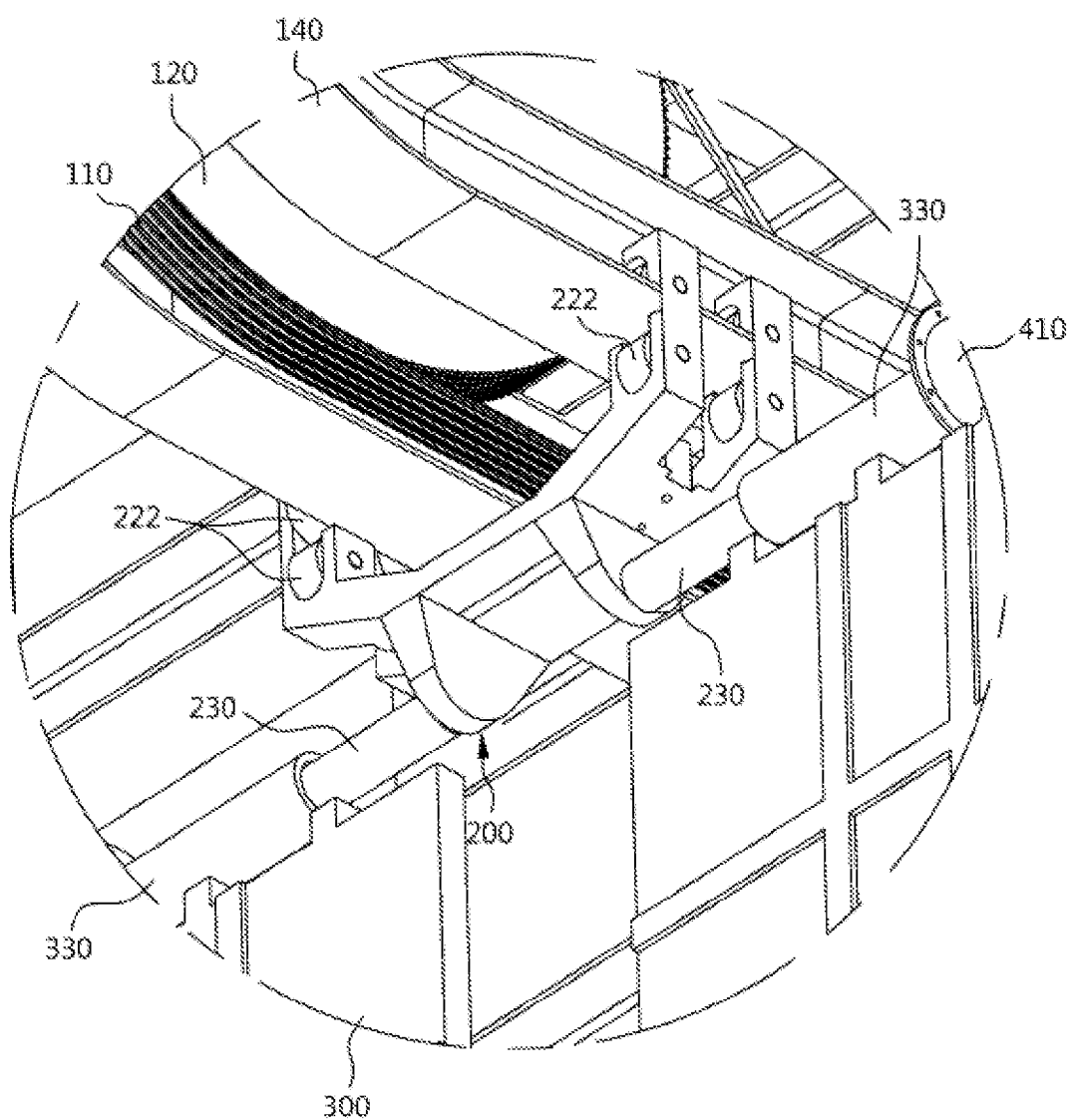
FIG. 5 is an expanded view of a specific region of FIG. 4.
Figure 6:
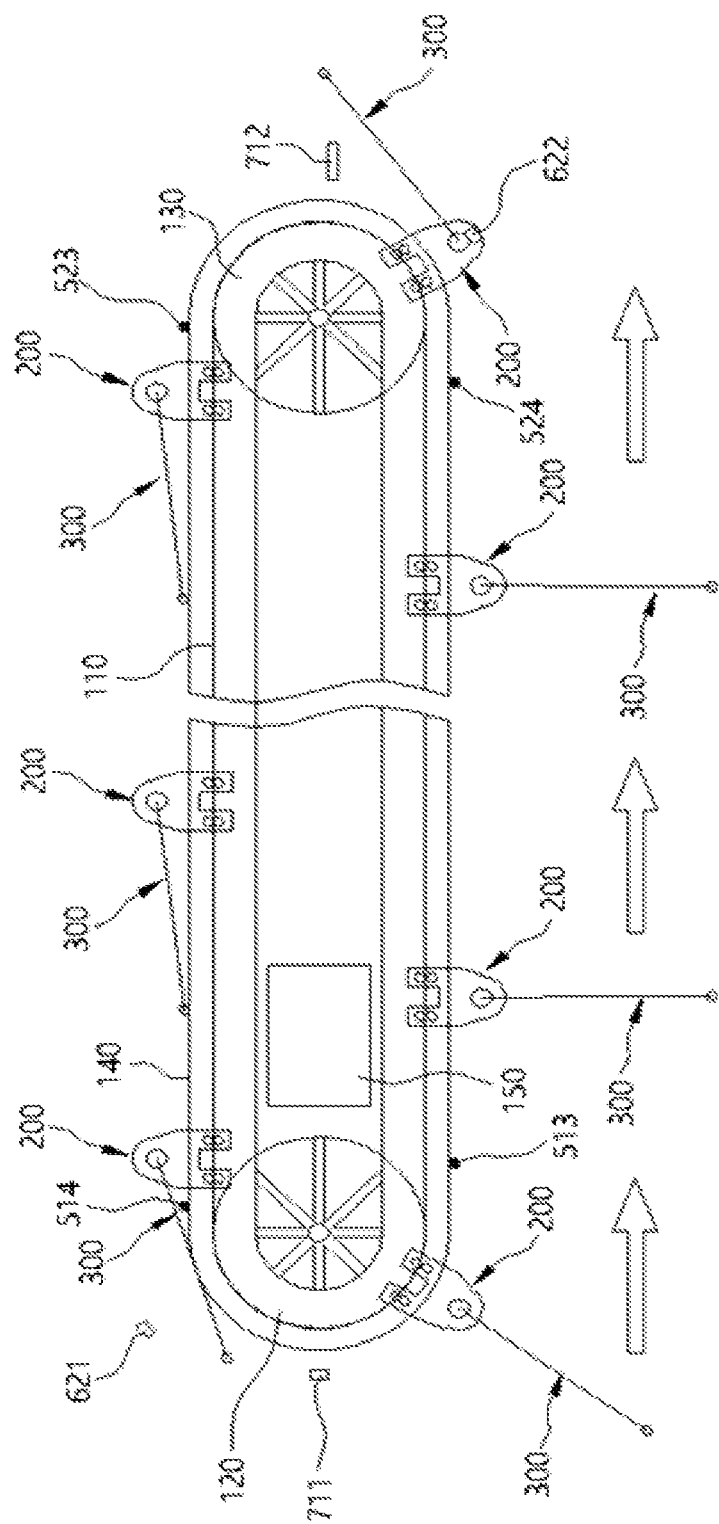
FIG. 6 is a schematic diagram to describe an operation of an exemplary embodiment of a tidal current power generator.

FIG. 1 is a perspective view of an exemplary embodiment of a tidal current power generator constructed according to the principles of the invention. FIG. 2 is an expanded view of a specific region (A) of FIG. 1. FIG. 3 is an expanded view of a specific region (B) of FIG. 1. FIG. 4 is a bottom side perspective view of an exemplary embodiment of a tidal current power generator as shown in FIG. 1. FIG. 5 is an expanded view of a specific region (C) of FIG. 4. FIG. 6 is a schematic diagram to describe an operation of an exemplary embodiment of a tidal current power generator.

Referring to FIGS. 1 to 6, a tidal current power generator according to exemplary embodiments includes a main frame 100, a plurality of operating bodies (Drive Proper Body: DPB) 200, a plurality of power plates (Flowing Power Plate; FPP) 300, clutch jaws 231 and 331 (shown in FIGS. 11 and 12) which are geared each other, locking part 410 and release part 510, 520 (shown in FIGS. 15 and 16) which handle engagement and isolation of the clutch jaws 231 and 331, and tilting parts (shown in FIG. 19) and lifting parts (shown in FIG. 17) which handle each of the plurality of FPPs 300.

The details of each of these configurations are as follows.

First, the main frame 100 is an outer body of the tidal current generator of the present invention. The mainframe 100 may be formed with a combination of an H-beam, and front and back of rectangular steel frame structure is installed in underwater among water flow direction.

In addition, at the front and rear edges of the main frame 100, a front sprocket 120 and a rear sprocket 130 that operate the chain 110 are installed. The chains 110 may be connected each other to continuously pass the front sprocket 120 and the rear sprocket 130. Further, on both sides of the chain 110 of the main frame 100, a guide rail 140 is installed. The guide rail 140 leads movements of each DPB 200 and it is form with H-beams.

Next, the generator 105 is a device that converts the rotational force of the sprocket 120, 130 into electric energy.

The generator may be configured with Gearbox in a Nacelle, which nearly locates on one of sprockets, and converting rotational energy of each sprocket 120 and 130, which was shifted by gearbox. The generator 105 can be provided with two power generators, and can be configured to be connected to each of the sprockets 120 and 130. It may also be configured to be connected.

FIG. 2 is an expanded view of a specific region (A) of FIG. 1. FIG. 2 shows a state in which the power plate 300 is laid flat. The FPP 300 is moved from the lower end to the upper end by the tidal current flow and then moved in the opposite direction of the tidal current flow.

Referring to FIG. 2, as illustrated above, the mainframe 100 may be formed with a combination of an H-beam, and front and back of rectangular steel frame structure is installed in underwater among water flow direction. The chain 110 connects the front sprocket 120 and the rear sprocket 130 and transmits power. The guide rail 140 leads movements of each DPB 200 and it is form with H-beams.

FPP 300 is a part of device that moves DPB 200 to direction of tidal current by force of water flow. The FPP 300 may be formed of a flat plate and is set up on both sides of the DPB 200. The size, height and thickness of the FPP 300 are designed up to capacity of electricity generation and forces of water flow, and additional plate 310 is provided on the surface of the FPP 300 to avoid bending.

The inner shaft 230 of the clutch jaw 231 fixes the FPP 300 and rotates according to the locking and unlocking of the outer pipe 330 of the clutch jaw 331 and the locking part 410 to adjust the direction of the FPP 300. The outer pipe 330 surrounds the inner shaft 230 and serves as a guide to transmit the force transmitted by the stepping motion of the locking part 410 to the inner shaft 230. In addition, the guide roller 222 serves as a guide to move the FPP 300 in the direction opposite to the tidal current without the DPB 200 separating from the upper rail.

FIG. 3 is an expanded view of a specific region (B) of FIG. 1.

Referring to FIG. 3, as illustrated above, the mainframe 100 may be formed with a combination of an H-beam, and front and back of rectangular steel frame structure is installed in underwater among water flow direction.

The DPB 200 is a binding part where the chain 110 and FPP 300 are coupled to each other. The DPB 200 may move along the guide rail 140 and help the FPP 300 to move by force.

A bending part 220 may be located on the side surface of the DPB 200. Also, a guide hole 221 and a guide roller 222 may be positioned at the bending part 220 so that the DPB 200 can smoothly move along the guide rail 140.

As already mentioned, the FPP 300 is a part of device that moves DPB 200 to direction of tidal current by force of water flow. An evasion groove 340 is formed at the edge of the FPP 300 (at the side to be coupled with the DPB), so that the displacement rollers 711, 712 reaching the corresponding parts can be passed through. The operation switch 414 is a device for operating the lifting locking part 410. The switch included in the locking part 410 for lifting 5i can be actuated by the operation switch 414 so that the FPP 300 can be locked.

FIG. 4 is a bottom side perspective view of an exemplary embodiment of a tidal current power generator as shown in FIG. 1. FIG. 5 is an expanded view of a specific region of FIG. 4.

FIGS. 4 and 5 illustrates the connection relation between the front sprocket 120 for operating a chain 110 disposed at an end of the main frame 100, an inner shaft 230 and an outer pipe 330, the locking parts 410 and 420 for engagement and spacing, and each FPP 300.

The chain 110 connects the front sprocket 120 and the rear sprocket 130 and transmits power. Also, the guide rails 140 guide the DPB 200 moved by the FPP 300 and the guide rollers 222 attached to the DPB 200 ride on the guide rails 140 to smoothly move the DPB 200. The inner shaft 230 is connected to a lower portion of the DPB 200. The inner shaft 230 and the outer pipe 330 are fastened to both ends of the inner shaft 230 to lock the FPP 300.

FIG. 6 is a schematic diagram to describe an operation of an exemplary embodiment of a tidal current power generator. The operation of the tidal current power generator according to the embodiment will be described with reference to FIG. 6.

FIG. 6 shows a state for explaining the operation of the tidal current generator in a situation where tidal current flow from left to right. In the state of FIG. 6, a first release slope 513, 514 located at the entry side (e.g., lower exit side) of the front sprocket 120 and a second release slope 523, 524 located at the advancing side (e.g., upper entry side) of the rear sprocket 130.

A rack gear 621 of a lying portion located near the front sprocket 120 (i.e., front rack gear) is rotatable supported by the pinion gear 610 of the FPP 300 passing through the front sprocket 120. The displacement rollers 711, 712 are positioned so that the bottom surface of the FPP 300 passing through the front sprocket 120 is in contact with the rear surface of the front sprocket 120, and the rear sprocket 130 is positioned to be spaced apart from the front sprocket 120. The Rack gear 622 located at a position adjacent to the rear sprocket 130 (i.e., rear rack gear) is positioned to be engaged with the pinion gear 610 of the FPP 300 passing through the rear sprocket 130. Displacement Roller (i.e., rear displacement roller) 712 is positioned to be out of the FPP 300.

A switch unit 801 shown in FIG. 24 disposed on a guide rail 140 (hereinafter referred to as a front switch portion) adjacent to the front sprocket 120. A switch part (i.e., rear switch portion) 802 is provided with a cut-off hole 821 for passing through the switch board 820 in an opened state and a front switch unit 801 and a rear switch unit 802.

Each FPP 300 that is locked the DPB 200 to the rear sprocket 130 through the front sprocket 120 is moved in a raised state. In the initial state as described above, each FPP 300 moved to the front sprocket 120 is moving in a tilting state.

Figure 11:
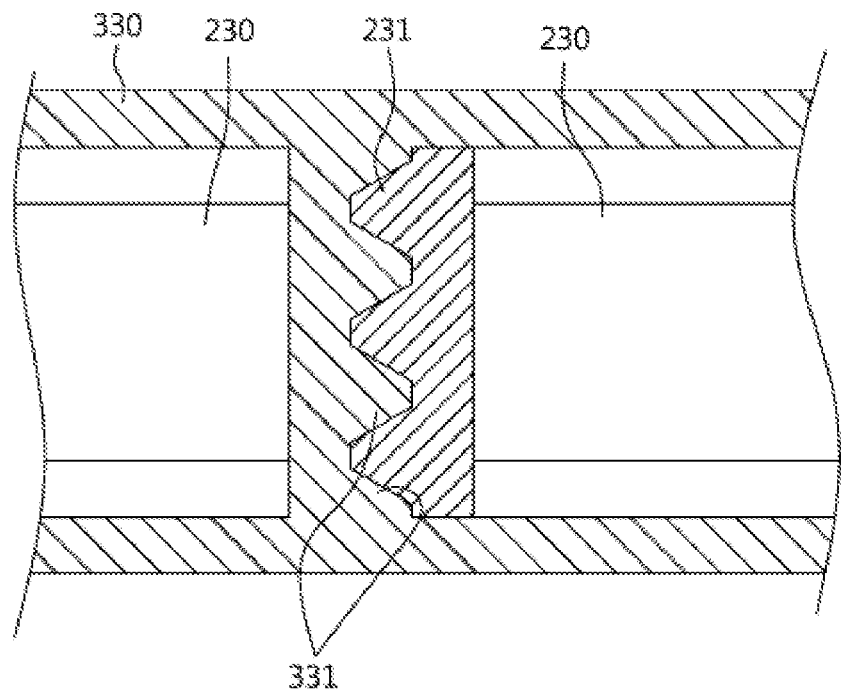
FIGS. 11 and 12 are diagrams to describe a relationship between each clutch jaw.
Figure 12:
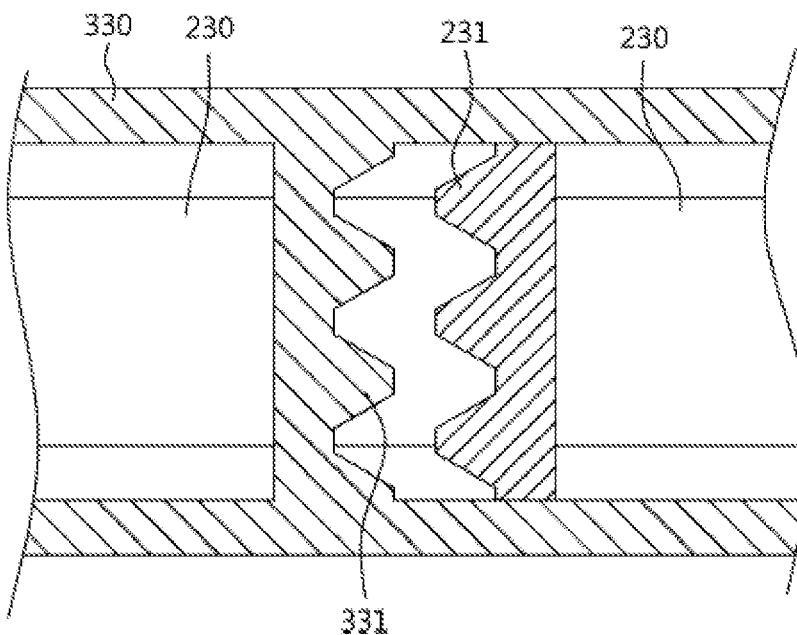

As shown in the FIGS. 11 and 12, the FPP 300 is in a released state in which the clutch jaw 331 formed on the outer pipe 330 is separated from the clutch jaw 231 formed on the inner shaft 230 of the DPB 200. Each FPP 300 is erected during the movement. However, due to the weight of the water flow and the FPP 300, the front end of the FPP 300 is maintained in a downward tilted state.

Particularly, the FPP 300 moved to the front sprocket 120 in the lying state is lifted due to contact with the forward displacement roller 711 while passing through the front sprocket 120. The outer pipe 330 of the FPP 300 is gradually rotated from the inner shaft 230 of the DPB 200 and the outer pipe 330 is rotated from the set angle (FPP is set up from the DPB). The operating switch 414 of the locking part 410 for pushing up is pressed against the switch bump 332 in the outer pipe 330 so that the compression springs 411. The clutch jaw 331 of the outer pipe 330 is engaged with the clutch jaw 231 of the inner shaft 230 while the outer pipe 330 is moved.

Thus, when the FPP 300 is completely passed through the front sprocket 120, the FPP 300 is locked in a standing state from the DPB 200.

The FPP 300 and the DPB 200 are moved to the rear sprocket 130 and the rear second release slope 524 positioned on the entry side (the bottom side in the FIG. 6) of the rear sprocket 130. The release bar 521 is abutted and gradually pressurized to operate the interlocking link 522.

The outer pipe 330 of the FPP 300, to which the interlocking link 522 is connected, is horizontally moved. Further, the clutch jaw 331 of the outer pipe 330 is coupled to the clutch jaw 231 of the inner shaft 230.

The rear rack gear 622 of the FPP 300 released from the DPB 200 meshes with the pinion gear 610 of the FPP 300. And the rear rack gear 622 of the FPP 300 moves along the rear sprocket 130. The outer pipe 330 is forcibly rotated and the outer pipe 330 is rotated by a predetermined angle (for example, 90 degrees) in a state where the two clutches jaws 231, 331 are spaced from each other. The key 422 of the locking bar 421 is inserted into the key groove 232 of the inner shaft 230 to lock the FPP 300, so that the FPP 300 is not rotated.

Therefore, the FPP 300 is rotated 90 degrees from the DPB 200 until the rear sprocket 130 is completely passed, and the FPP 300 is held in a tilting state.

When the FPP 300 reaches the advancing side (the upper side in the FIG. 6) of the rear sprocket 130, the rear first release slope 514 located at the corresponding position releases the locking bar of the DPB 200. The key 422 is released from the key groove 232, thereby releasing the locking of the FPP 300.

In this state, the FPP 300 is inclined downward with respect to the outer pipe 330 coupled with the DPB 200 by its own weight and water flow, whereby the FPP 300 is moved in a direction opposite to the flow direction of the tidal current, so it is possible to smoothly carry out the movement.

Thus, the front sprocket 120 and the rear sprockets 130 are continuously rotated by the continuous movement of the chain 110 by repeating the above-described process. The rotational force of the sprockets 120, 130 is transmitted to gear box in the nacelle 150, shifted by each of the transmission gears in the gear box, and then supplied to the generator to be converted into electric energy.

Figure 7:
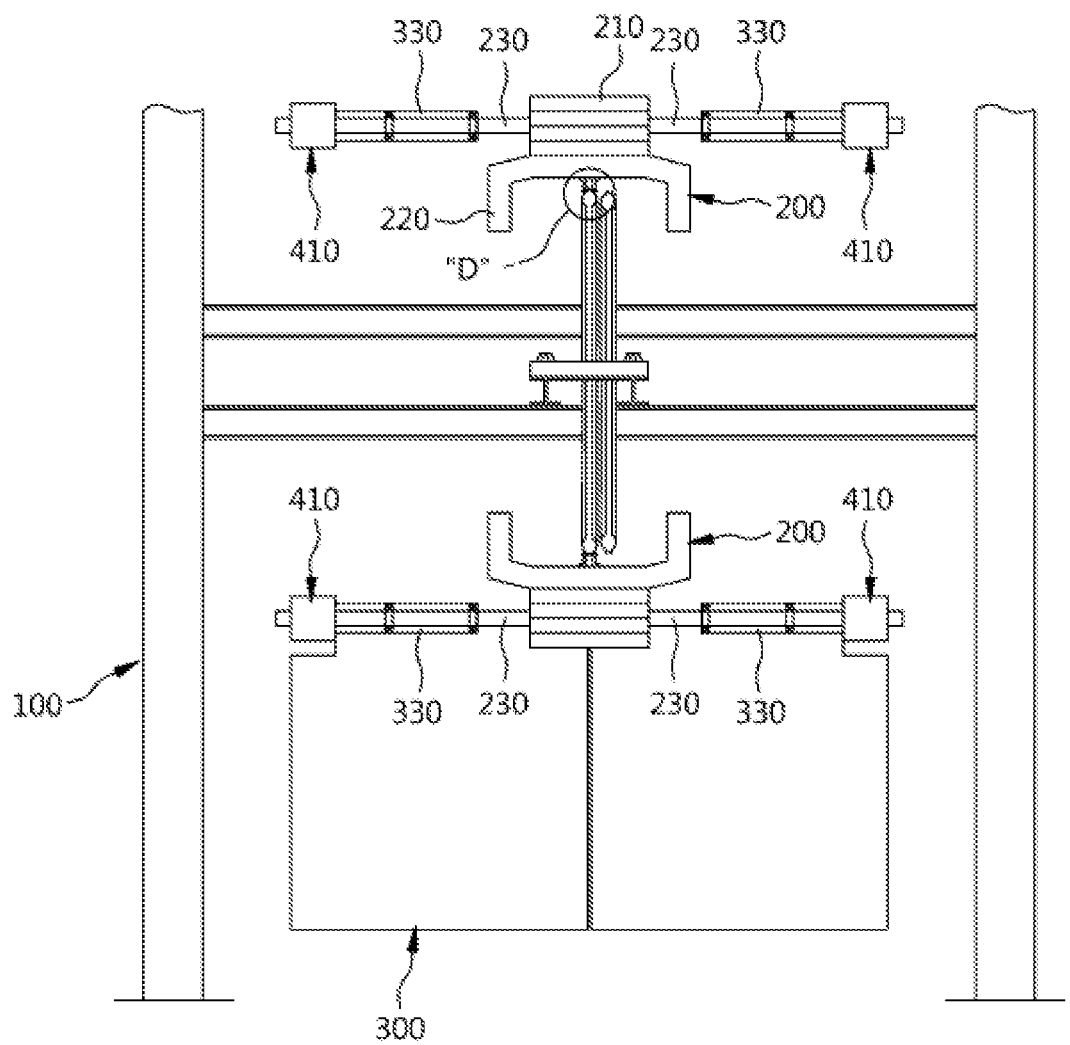
FIG. 7 is a diagram to describe a connection configuration between the chain, the operating body, and the power plate shown in FIG. 5.
Figure 8:
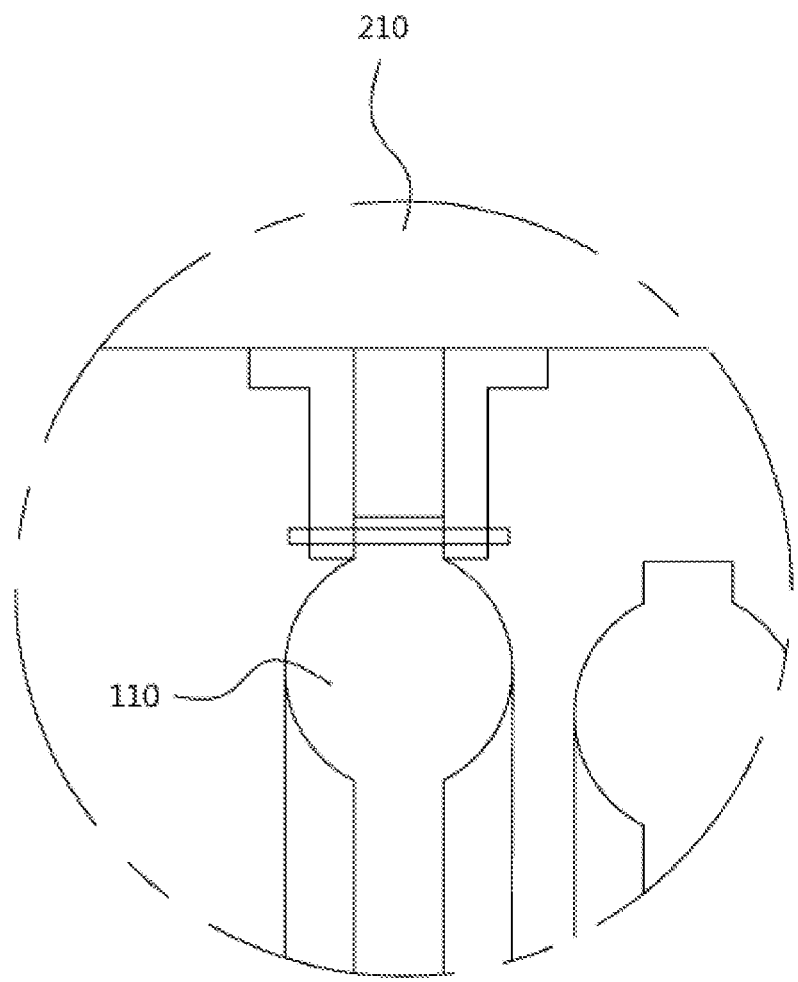
FIG. 8 is an expanded view of a specific region of FIG. 7.

FIG. 7 is a diagram to describe a connection configuration between the chain, the operating body, and the power plate shown in FIG. 5. FIG. 8 is an expanded view of a specific region of FIG. 7. The coupling structure between the chain 110, the DPB 200, and the FPP 300 will be described with reference to FIGS. 7 and 8.

The DPB 200 is installed at the upper and lower ends of the main frame 100 and moves along the guide rails. The fixing part 210 of the DPB 200 contacts the chain 110 to transmit the force. The inner shaft 230, the outer pipe 330 and the locking part 410 are fastened to both sides of the fixing part 210 and the FPP 300 is connected to the inner shaft 230.

Figure 9:
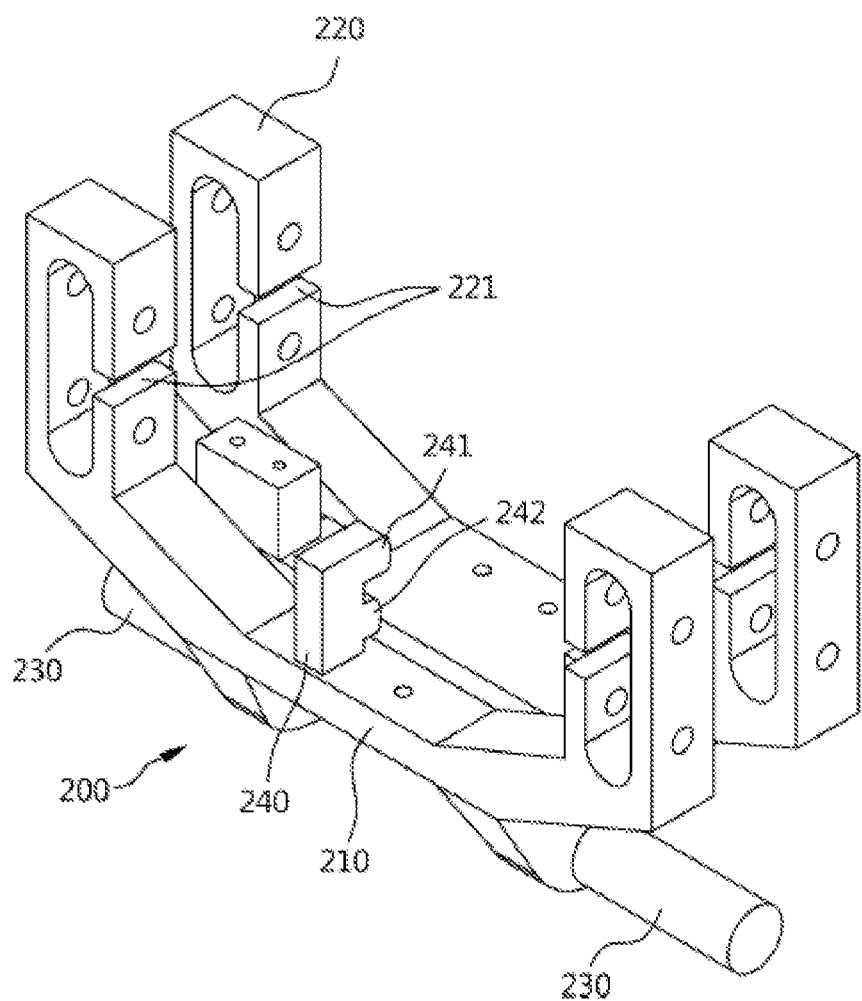
FIG. 9 is a perspective view of an exemplary embodiment of the operating body.
Figure 10:
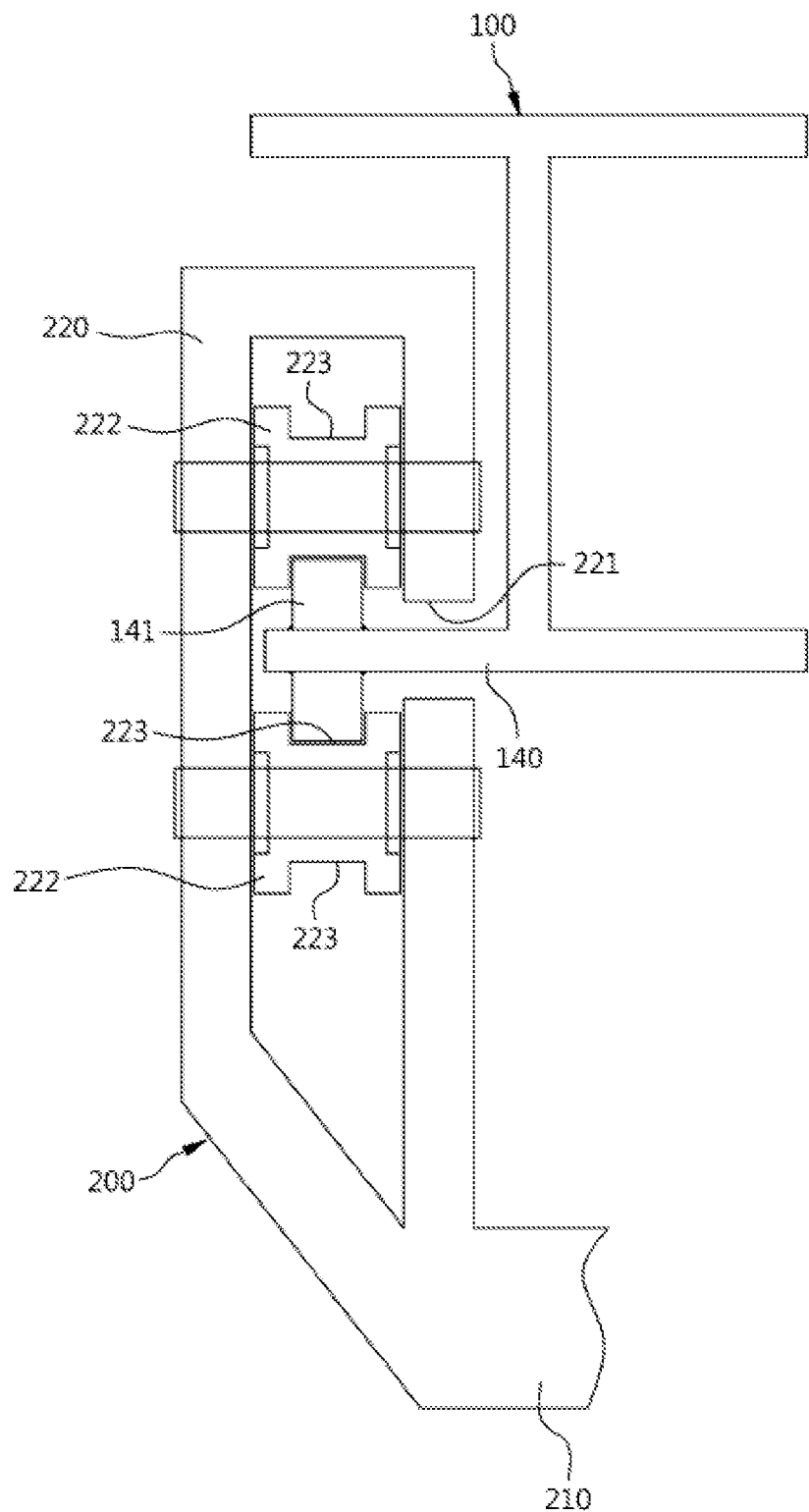
FIG. 10 is an expanded view of the operating body structure to describe an embodiment of the mounting structure of guide rollers.

In addition, FIG. 9 is a perspective view of an exemplary embodiment of the operating body. FIG. 10 is an expanded view of the operating body structure to describe an embodiment of the mounting structure of guide rollers.

As shown in FIG. 9, the DPB 200 may include the fixed part 210 and bending part 220.

Here, the fixed part 210 may form the main body of the DPB 200, and the bending part 220 is bent upward (or downward) from both sides of the fixed part 210.

Particularly, on the facing surface of bending part 220, guide hole is formed where guide rail 140 is passing through. And there are guide rollers 222 on the place where lower and upper surface of guide rail meets on inner side of guide hole 221.

Further, a guide pin 141 is added on the guide rail 140, and guide groove 223 is also added on the guide roller 222 to engage a portion of the guide pins 141. Thus, additional structures such as the guide pins 141 and the guide groove 223 make possible the guide roller 222 always operate among exact position of guide rail 140.

Further, the bending part 220 forms two or more rows among moving direction of DPB. Therefore, tilting occurrence can be prevented while moving forward because guide rail 140 leads the DPB 200.

On the other hand, inner shaft 230, which is exposed to outside, is located on both side surfaces of the fixed part 210 of the DPB 200, and there is an outer pipe 330 on the one of edge surface of the FPP 300. The outer pipe 330 is designed to encase and rotate on the inner shaft 230.

FIGS. 11 and 12 are diagrams to describe a relationship between each clutch jaw.

The clutch jaw 231, 331 is a part of device which makes the outer pipe 330 maintains state of tilting or locking to the inner shaft 230. In other words, the clutch jaw 231, 331 serve to lock or release the outer pipe 330 by the inner shaft 230.

According to the operation of the clutch assembly, the FPP 300 can maintain a state in which the FPP 300 is laid down or standing up.

As shown in the FIGS. 11 and 12, the clutch jaw 231, 331 is located on the inner circumferential surface of the outer pipe 330 and outer circumferential surface of inner shaft 230, and multiple teeth of gears are meshed among facing direction.

Figure 15:
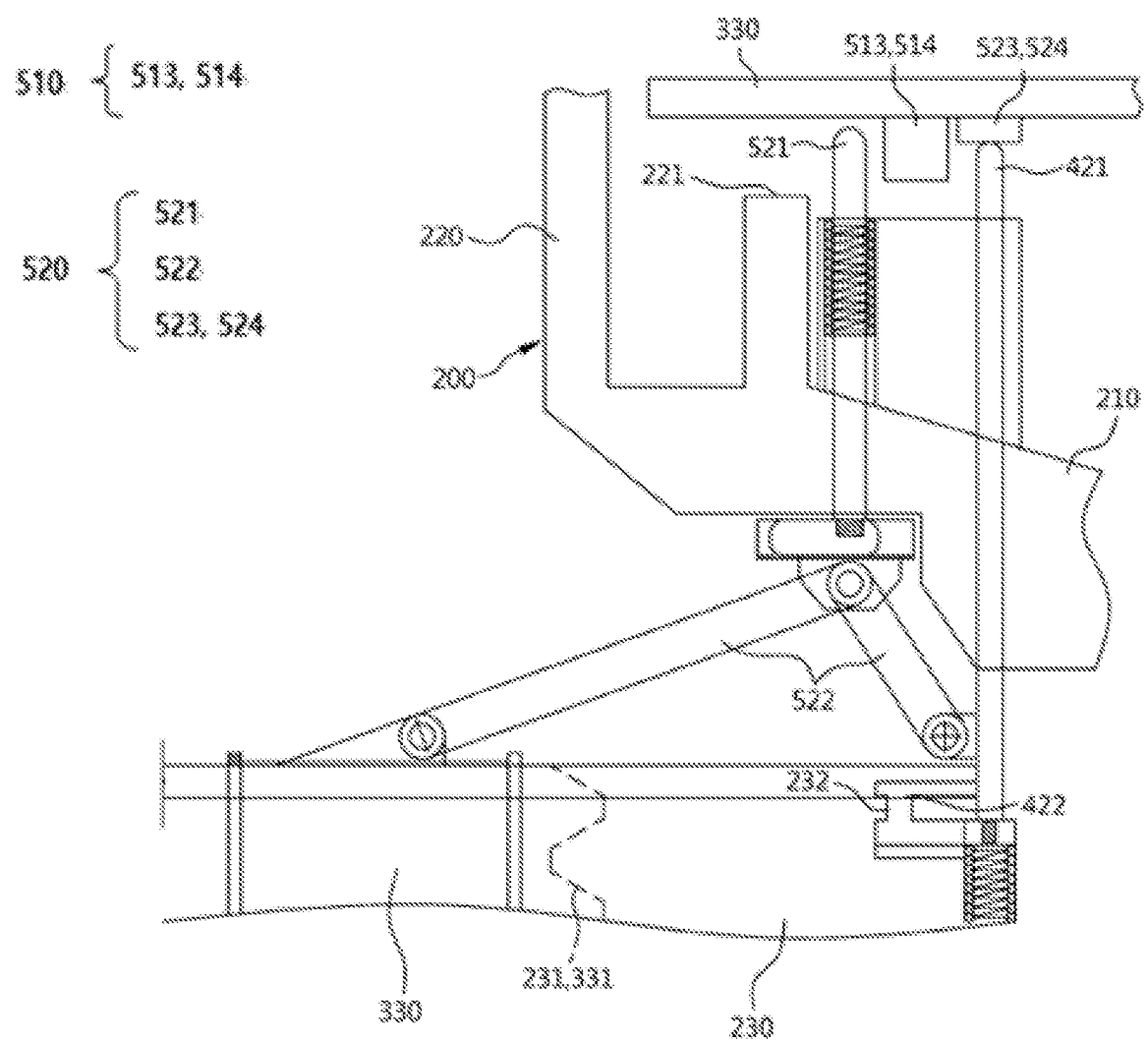
FIGS. 15 and 16 are diagrams to describe an embodiment of the first and second release part.
Figure 17:
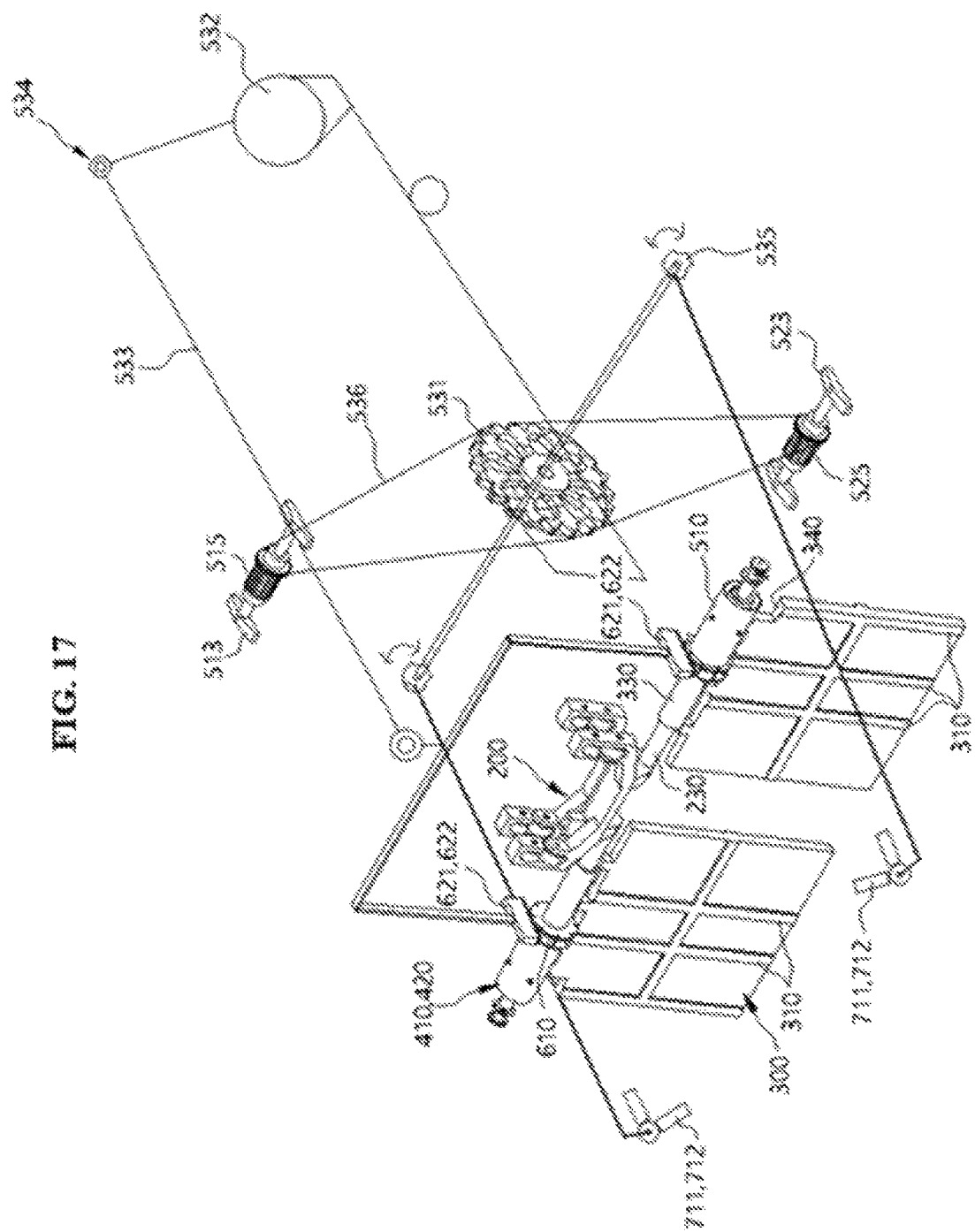
FIG. 17 is a diagram to describe interlocking relationships between release parts and tiling and lifting parts.

That is, when the outer pipe 330 moves toward to the inner shaft 230 by operating movement of locking parts 410, 420 shown in FIG. 17, as shown in FIGS. 11 and 15, the two clutch jaws 231, 331 are meshed each other. This operation locks the outer pipe 330, so outer pipe is not able to turn itself. When the outer pipe 330 moves to opposite direction of inner shaft 230 movement by operation of release parts 510 shown in FIG. 17, as shown in FIG. 12, the two clutch jaws 231, 331 are separated from each other. As a result, locked outer pipe 330 is released and is able to turn itself.

Next, the locking parts 410 and 420 are the parts that are engaged with the coupling portion of the clutch jaw 331 formed on the outer pipe 330 of the FPP 300 and the clutch barrel of the other clutch jaw 231 formed on the inner shaft 230 of the DPB 200. The locking parts 410, 420 may include the tilting part 420 and the lifting locking part 410.

The lifting locking part 410 locks each clutch jaw 231 and 331 to the FPP maintain lifting (standing) state when tilted FPP passes one of sprockets 120 and 130, and the FPP is lifted.

In an exemplary embodiment, the lifting locking part 410 may force the outer pipe 330 to the inner shaft 230 by turning operation of the outer pipe 330. Thus, the clutch jaw 331 of the outer pipe 330 and the clutch jaw 231 of the inner shaft 230 are meshed each other.

Figure 13:
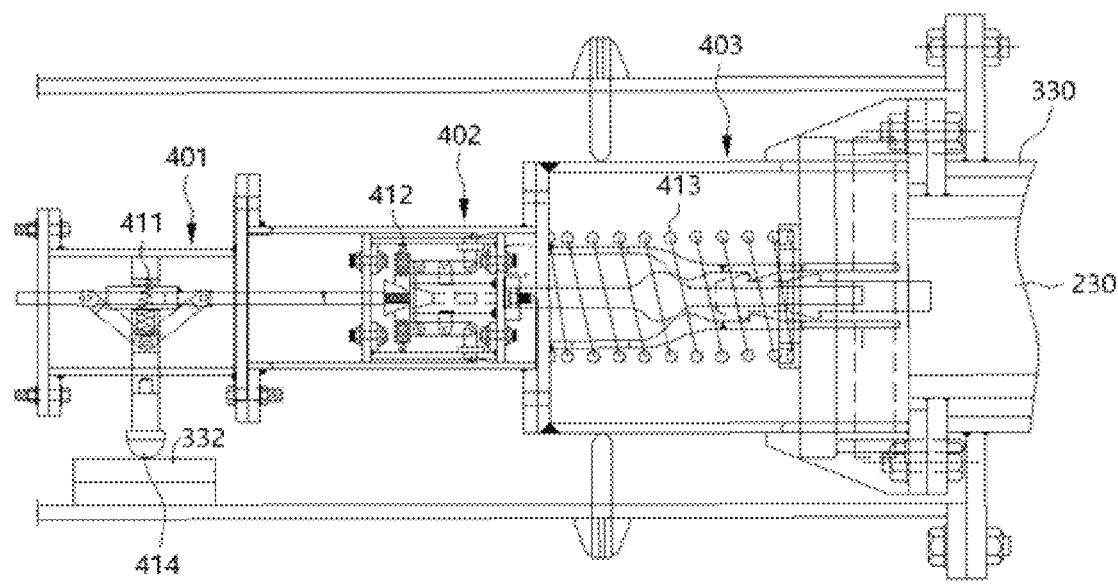
FIG. 13 is a diagram to describe an embodiment of the lifting locking structure.

FIG. 13 is a diagram to describe an embodiment of the lifting locking structure.

The lifting locking part 410, as shown in FIG. 13, may include multiple stage parts 401, 402, and 403 which contains various compression springs 411, 412, and 413. Each compression spring has a different modulus of elasticity. As sequentially installed multiple stage spring part, restoring behavior of sequential compression springs 411, 412, and 413 locks FPP to maintain lifting (standing) position. At this moment, each compression spring 411, 412, and 413 of lifting locking part 410 is sequentially compressed and locked when clutch jaw 331 of the outer pipe 330 moves the outer pipe 330 to the direction where the clutch jaw 331 of the outer pipe 330 is isolated from the clutch jaw 231 of the inner shaft 230.

In particular, the switch bump 332 is located in the inner circumferential surface of the outer pipe 330, and there is the operating switch 414 of spring stage, which is designed to be exposed to outside, on the first stage part 401 of compression spring 411. When the operating switch 414 is pushed by the switch bump 332, locked compression springs 411, 412 and 413 on each stage are sequentially restored and released. Thus, the clutch jaw 331 of the outer pipe 330 and the clutch jaw 231 of the inner shaft 230 are meshed each other when the outer pipe 330 is moved by restoring forces of compression the springs 411, 412, and 413. Also, as an example, the compression spring 413 provided in the last stage part 403 can provide a greater restoring force than the compression springs 411 and 412 provided in the other stage parts 401 and 402.

Figure 14:
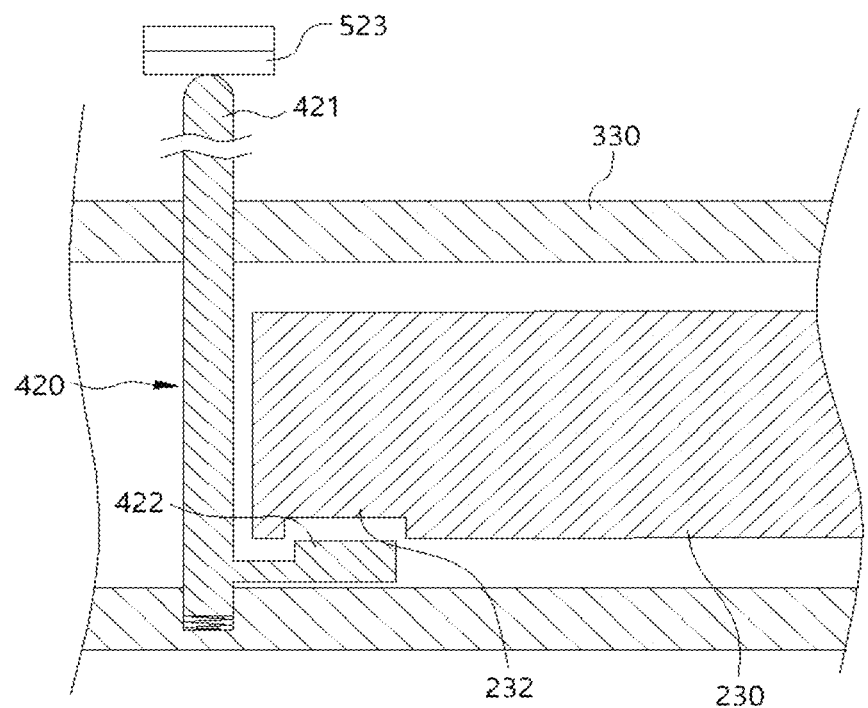
FIG. 14 is a diagram to describe an embodiment of the tilting locking structure.

FIG. 14 is a diagram to describe an embodiment of the tilting locking structure.

Referring to FIG. 14, when the FPP 300 is tilted while it passes one of sprockets 120 and 130, the tilting lock part 420 locks the clutch jaws 231 and 331 to FPP maintains it tilting state until the FPP fully passes the sprocket 120, 130.

For this purpose, as shown in attached FIG. 14, there is a key groove on the outer surface of inner shaft, and the locking part sequentially passes the DPB 200 and outer pipe and is exposed from elastically installed Locking Bar and its outer surface. Thus, there is also a key which fits into the key groove on the inner shaft through rotating movement of outer pipe.

In other words, the key 422 is engaged into the key groove 232 by restoring move of locking bar 421, and the key 422 is released from the key groove 232 when the locking bar 421 is pushed and pressed.

Also, the key groove 232 and the key 422 are formed in such a manner that the clutch jaw 331 of the outer pipe 330 is rotated 90° with respect to the outer pipe 330 while being separated from the clutch jaw 231 of the inner shaft 230.

Figure 16:
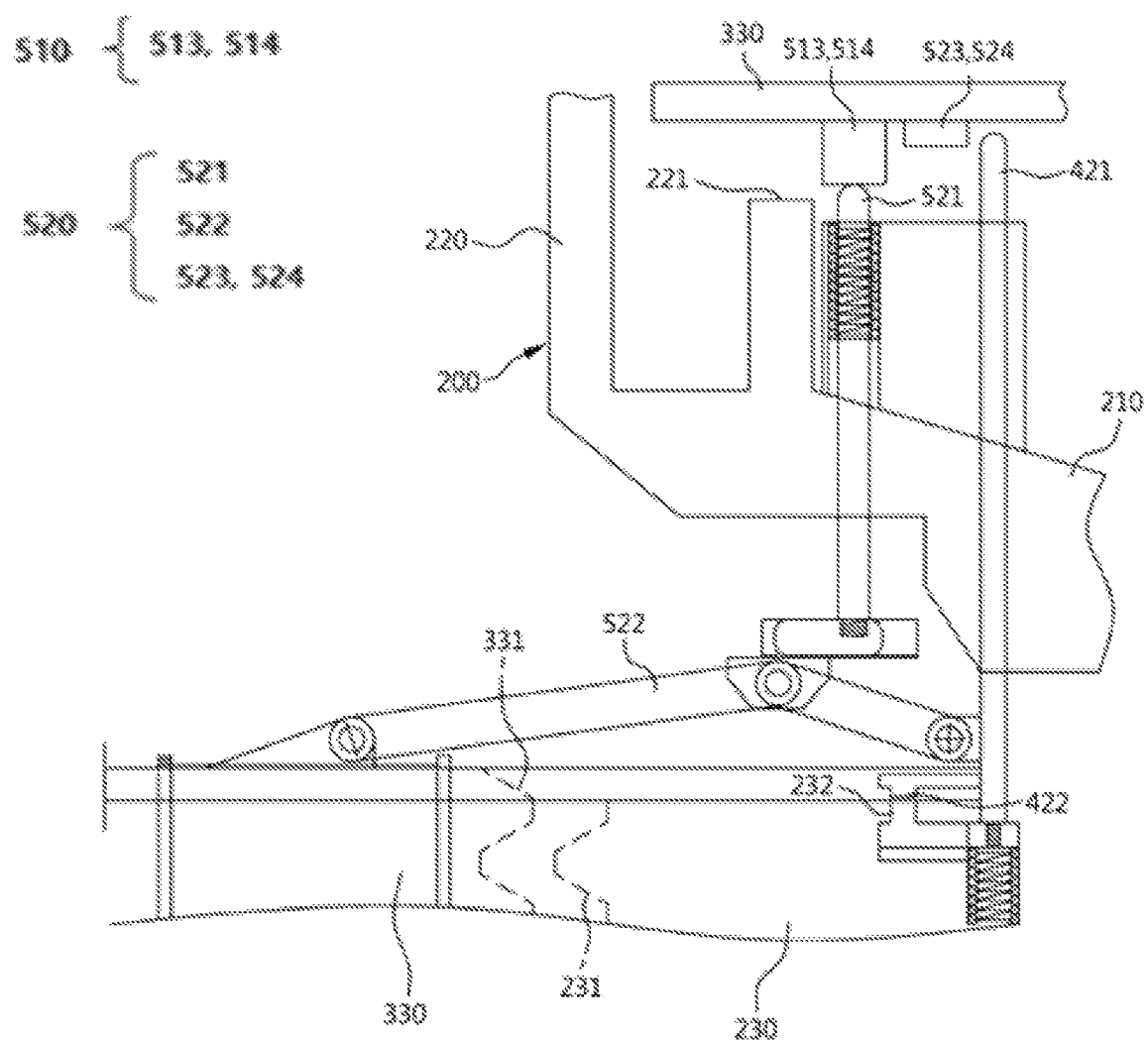

FIGS. 15 and 16 are diagrams to describe an embodiment of the first and second release part 510 and 520. For example, FIG. 15 shows the two clutch jaws 231, 331 are combined each other and then FIG. 16 shows the two clutch jaws 231, 331 are separated from each other due to the operation of the release part.

Referring to FIGS. 15 and 16, the release part is a part which isolates each clutch jaw 231, 331. The release part may include first release part 510 and second release part 520.

In the first release part 510 as shown in FIGS. 15 and 16, the clutch jaw 331 on the FPP's outer pipe 330 is isolated from clutch jaw 231 on the DPB's inner shaft 230 when FPP maintains standing position and passes a sprocket 120 and 130. After passes the first release part 510, in the second release part 520 as shown in FIGS. 15 and 16, the clutch Jaw 331 on the FPP's outer pipe 330, which was locked when it passes another sprocket 120, 130, and is isolated from clutch jaw 231 on the DPB's inner shaft 230 as shown in FIG. 16.

Here in, as shown in attached FIGS. 15 and 16, the first release part 510 is in the guide rail 140 as shown in FIG. 10, and the first release part 510 may include the first release slope 513, 514 which is located on the moving direction of the locking bar 421 which is formed to be inclined.

At this moment, the locking bar 421 is gradually pressed by the first release slope 513, 514 when the DPB 200 passes the first release slope 513, 514, and the key 422 is released from the key groove 232 of the inner shaft 230.

Further, as shown in attached FIG. 15 and FIG. 16, the second release part 520 may include a release bar 521, which is designed to pass through DPB 200, an interlocking link 522 isolated from the clutch jaw 231 of the inner shaft 230 when the release bar 521 is pressed, and the second release slope 523, 524, which is inclined with respect to the moving direction of the DPB 200 and presses the release bar 521 of the DPB 200 passing through the corresponding portion.

Figure 18:
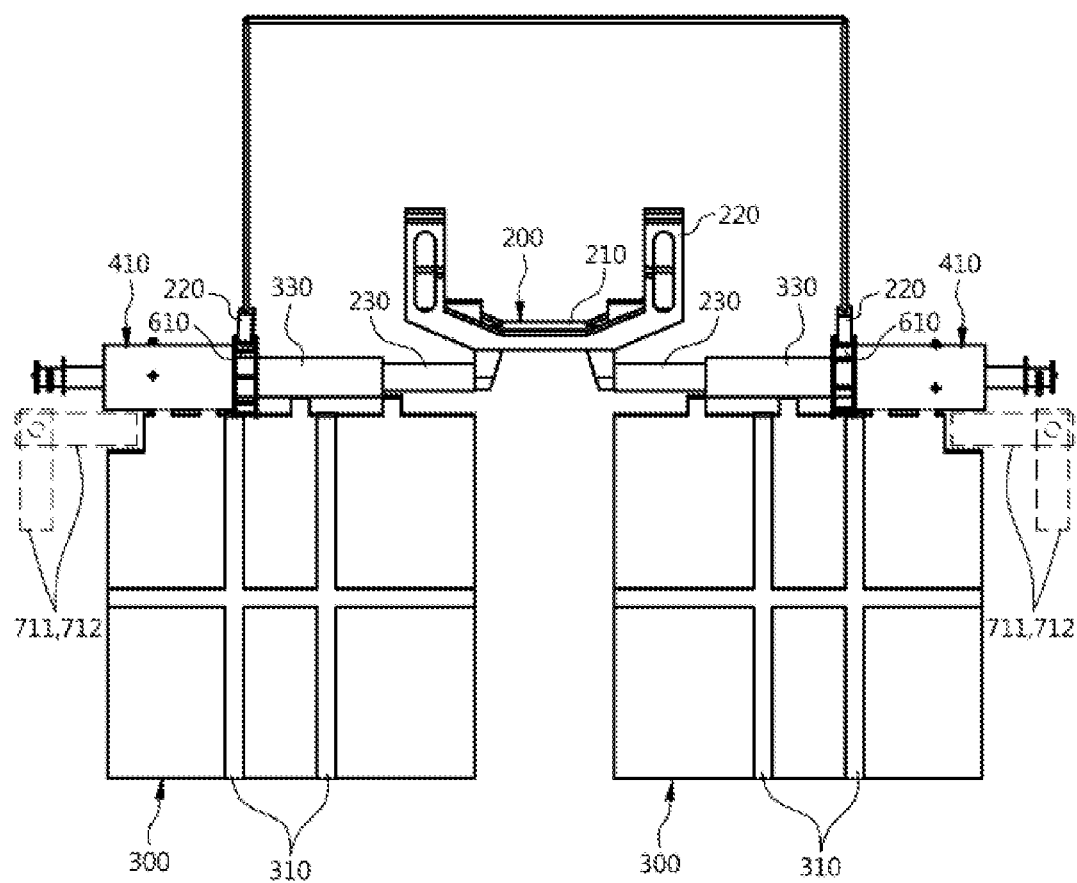
FIG. 18 is a front view to describe an embodiment of titling state of the power plate.
Figure 19:
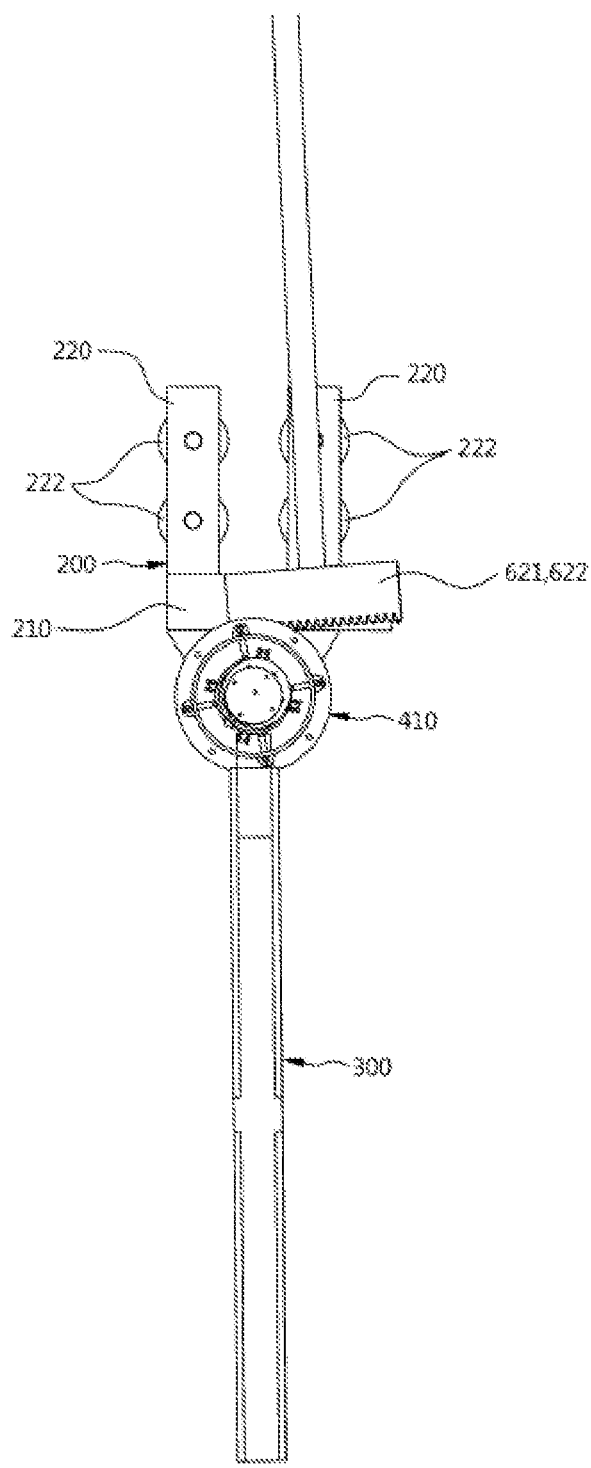
FIGS. 19 through 21 are side views to describe an embodiment of the tilting process of the power plate.
Figure 20:
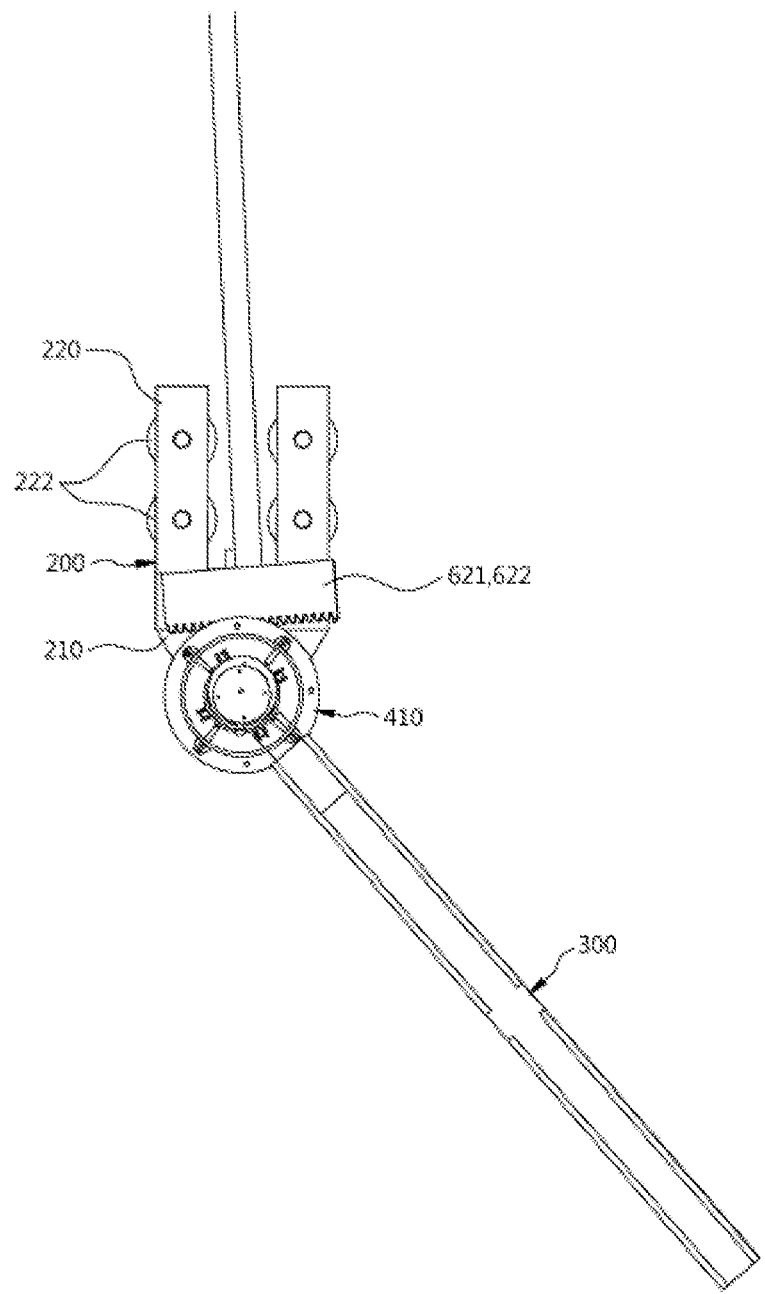
Figure 21:
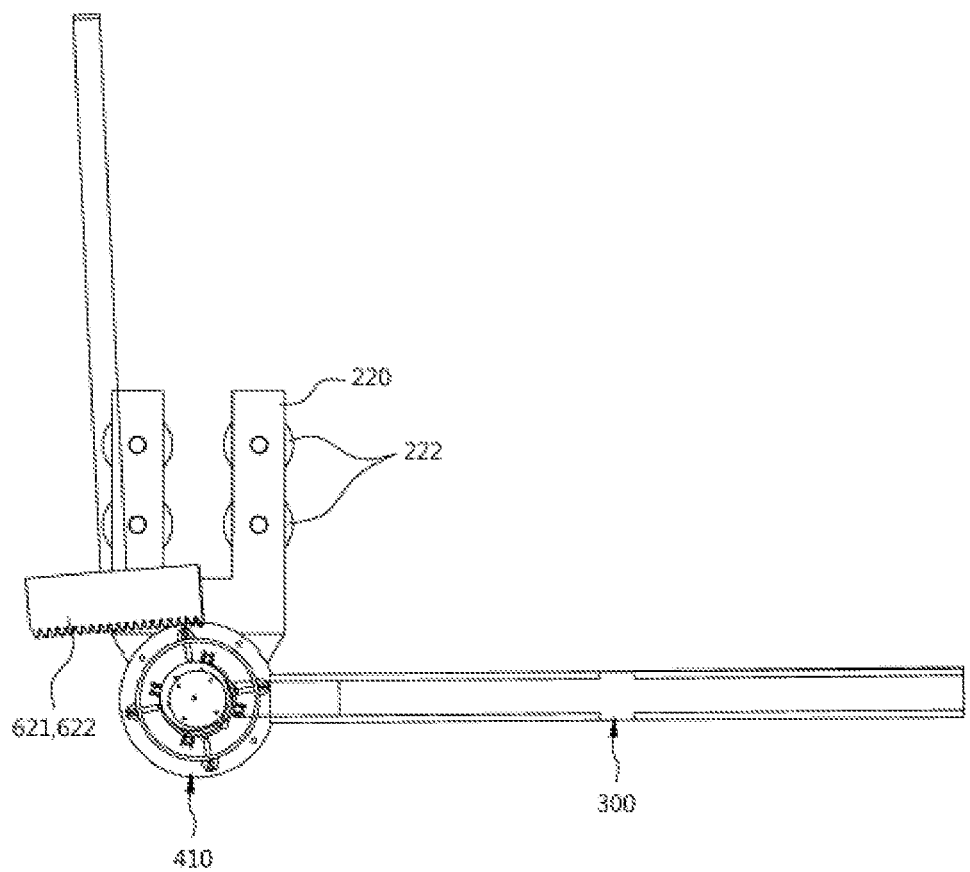

FIG. 17 is a diagram to describe interlocking relationships between release parts and tiling and lifting parts. FIG. 18 is a front view to describe an embodiment of titling state of the power plate. Also, FIGS. 19 through 21 are side views to describe an embodiment of the tilting process of the power plate.

FIG. 17 shows the "tilting locking part" and the "lifting locking part" as a combination of the elements which illustrated in FIG. 17. The tilting locking part is a part to tilt down FPP 300 when the FPP 300 passing through the respective sprockets 120 and 130. As shown in FIG. 17 to 21, the tilting locking part may include a pinion gear 610, which is on the outer surface of the outer pipe 330 of the FPP 300, and a rack gear 621 and 622, which is on the passing way of pinion gear 610 and turns pinion gear 610 forcibly.

In other words, the pinion gear 610 which is released with lifting (standing) state, is turned 90 degrees and meshed with rack gear 621, 622 when pinion gear 610 passes rack gear 621, 622. At this moment, FPP is also turned 90 degrees and tilted down forcibly.

Such a structure is designed to prevent breakage of the FPP 300 and the DPB 200. The key 422 of the tilting locking part 420 is inserted into the key groove 232 of the inner shaft 230 when the FPP 300 is tilted down. As a result, tilted state FPP 300 is locked to reduce water resistance at parallel direction of water flow. Thus, FPP's lifting and tilting is operated precisely even if a sprocket 120, 130 rotates clockwise or counter-clockwise direction.

Next, the lifting locking part is a part to lift FPP 300 passing through the respective sprockets 120, 130. The lifting locking part includes the displacement rollers 711 and 712, which installed on the guide rail 140.

As illustrated in FIG. 6, the displacement rollers 711 and 712 serve to induce the FPP 300 to be forcedly raised while the bottom surface of the FPP 300 passing through one of the sprockets 120, 130 is in contact with the displacement rollers 711 and 712 in tilting state.

At this moment, an evasion groove 340 is formed at the edge of the FPP 300 (at the side to be coupled with the DPB), so that the displacement rollers 711 and 712 reaching the corresponding parts can be passed through.

Particularly, the displacement rollers 711, 712 are selectively operated to be positioned in the transverse direction (direction transverse to the moving direction of the FPP) or in the longitudinal direction (direction positioned toward the moving direction of the FPP). This structure is to prevent the displacement rollers 711, 712 from bumping into the FPP 300 when the direction of movement of the FPP 300 is reversed.

On the other hand, the first release slope 513 and the second release slope 523 are operated to be in a fixed position at the same time or simultaneously to move out of position. When one of the release slopes 513, 523 is operated, the other one of the release slopes 513, 523 is also operated.

At this moment, the first release slope 513 is positioned at a position corresponding to the moving direction of the locking bar 421, and the second release slope 523 is positioned at the same position as the release bar 521.

Each of the release slopes 513, 523 is positioned to protrude from both sides of rotation shafts 515, 525 provided on the guide rail 140 and is moved in a direction away from each other due to the forward and reverse rotation of the rotation shafts 515, 525. That is, the two release slopes 513, 523 are screw-connected in opposite directions within the rotation shafts 515, 525, and the two slopes 513, 523 are rotated in the forward and reverse directions of the rotation shafts 515, 525.

The first release slope 513 and the second release slope 523 are interlocked with the displacement rollers 711, 712, and the rack gears 621, 622. When the first release slope 513 is operated to be positioned at a predetermined position, the displacement rollers 711, 712 are positioned to contact the bottom surface of the FPP 300 passing the sprockets 120, 130. When the first release slope 513 is operated to move out of the predetermined position, the displacement rollers 711, 712 are positioned on the corresponding sprockets of the FPP 300. And the rack gears 621, 622 are positioned to be separated from the pinion gear 610 of the FPP 300.

At this moment, as shown in the FIG. 17, the release slopes 513, 523, the displacement rollers 711, 712 and the rack gears 621, 622 are engaged with the weight 532, the shaft 534 of the wire 533, the interlocking sprocket 531, and the link 536.

The first release slope 513 and the second release slope 523, the displacement rollers 711, 712, the rack gears 621, 622, the weight 532, the wire 533, the interlocking sprocket 531, the cam 535 and the link 536 are respectively provided at two portions of the guide rail 140 that pass through the two sprockets 120, 130.

The two first release slopes 513 are configured to move in opposite directions, and the second release slopes 523 are configured to move in opposite directions. That is, when one of the first release slopes 513 and the second release slopes 523 is operated to be in the correct position, the other first release slopes 514 and the second release slopes 524 is operated to move out of the correct position.

The DPB 200 is provided with the operation pointer 240 and the outer circumferential surfaces of the rotating shafts 515, 525 to which the release slopes 513, 523 are coupled are formed of pinion gears. And the switch units 801, 802 are driven to move the two rack gears 621, 622 in opposite directions.

Figure 22:
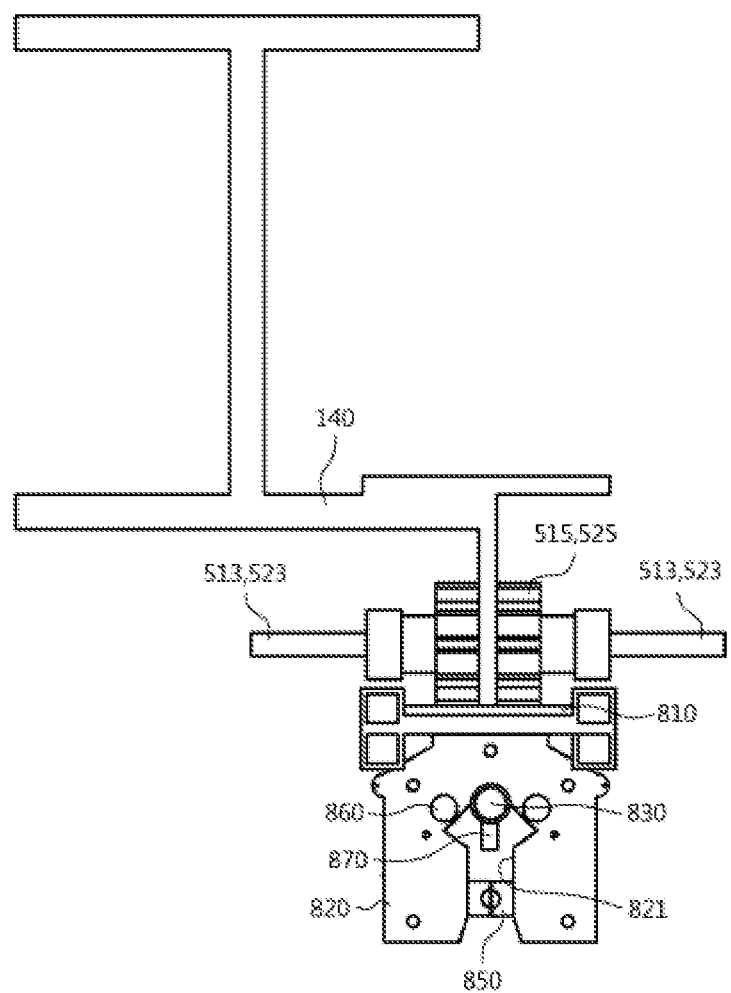
FIG. 22 is a diagram to describe an embodiment of the mounting structure of the switch parts.
Figure 23:
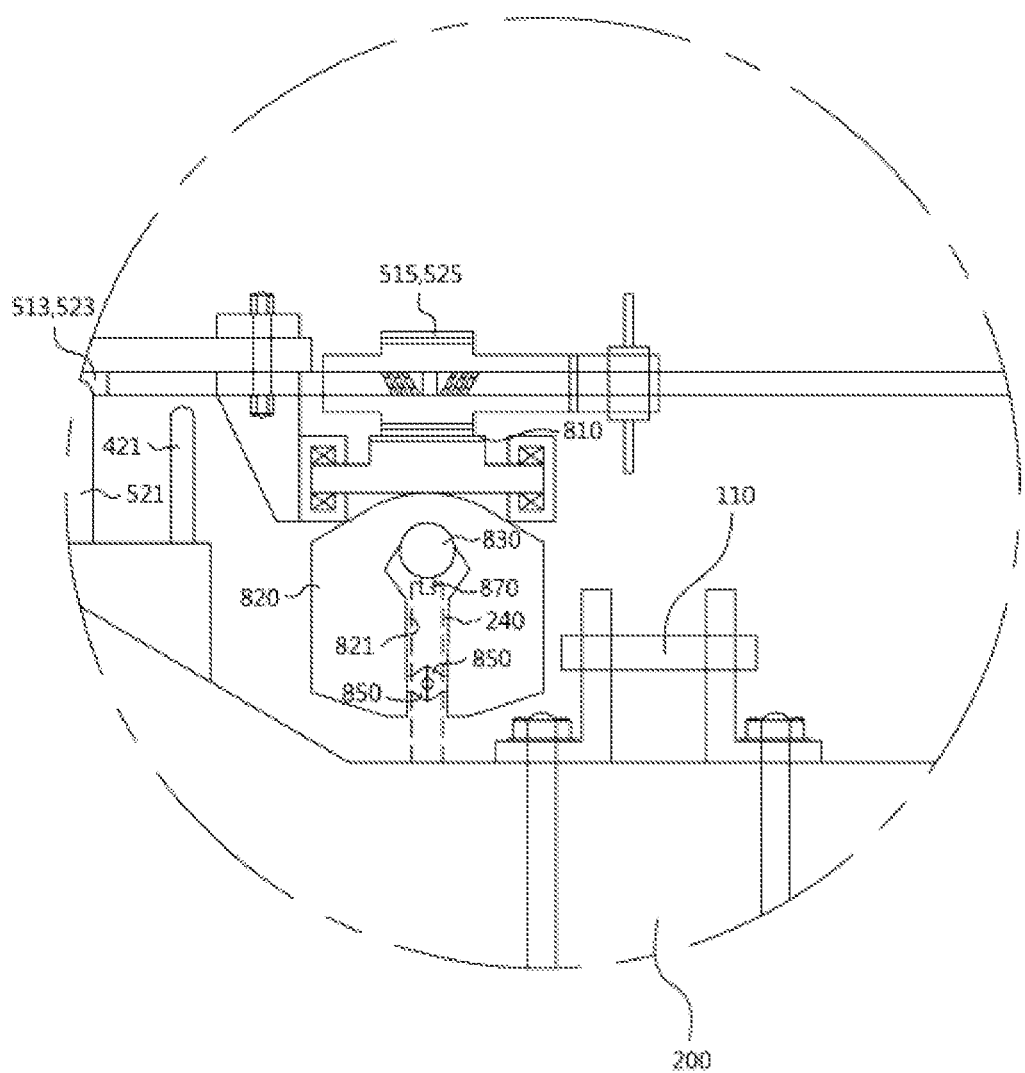
FIG. 23 is a diagram to describe relationship between mounting structure of the switch parts and the operating body.

FIG. 22 is a diagram to describe an embodiment of the mounting structure of the switch parts. FIG. 23 is a diagram to describe relationship between mounting structure of the switch parts and the operating body. FIGS. 24 and 25 are diagrams to describe an embodiment of the switch operating process of the power plate.

As shown in the FIGS. 22 through 25, the switch units 801, 802 are installed to move over the portion where the rotating shaft 525 is installed and have a rack plate 810 engaged with the pinion gear of the rotating shaft 525 on the upper surface. A rotation shaft 830 rotatable installed on both sides of the passage cut-off hole 821 of the switch board 820, a switch board 820 having a passage cut off a rotation link 840 coupled to each of the rotation shafts 830 and rotated by the axial movement of the rotation shaft 830. The rotation link 840 and the rotation shaft 830 of the DPB 200 are rotated in a direction adjacent to each other, and a barrier 850 intercepting the passage cut-off hole 821 and rotating the respective rotation shafts 830 in a moving direction of the DPB 200 having a moving shaft 860.

At this moment, a circumferential surface of the moving shaft 860 is further provided with a pushing bump 870, and the moving shaft 860 is rotated by electronic control every time the flow direction of the tidal current is changed, so that the pushing bump 870 is positioned in the cut-off hole 821 for passage.

As shown in the attached FIG. 9, the operation pointer 240 of the DPB 200 is formed with a first bump 241 for forcibly pushing the pushing bump 870 and a second bump 242 for pushing the barrier 850.

At this moment, when the rack plate 810 is moved by a predetermined distance, the moving shaft 860 is rotated, so that the pushing bump 870 is separated from the movement path of the first bump 241, and, it is moved away from the movement path of the second bump 242 while being widened.

The switch units 801, 802 are located on the guide rails 140 passing through the two sprockets 120, 130. The pushing bump 870 is positioned on the moving direction side of the first bump 241. GPS (Global Positioning System) is used to measure the time the tidal current change.

Hereinafter, the operation of the tidal current power generation apparatus to describe the exemplary embodiments described above will be described in more detail.

FIG. 6 shows a state for explaining the operation of the tidal current generator in a situation where tidal current flow from left to right.

In the state of FIG. 6, the first release slope 513 located at the entry side of the front sprocket 120 and the second release slope 523 located on the advancing side of the rear sprocket 130.

A rack gear 621 of a lying portion located near the front sprocket 120 (a front rack gear) is rotatable supported by the pinion gear 610 of the FPP 300 passing through the front sprocket 120. The displacement rollers 711, 712 are positioned so that the bottom surface of the FPP 300 passing through the front sprocket 120 is in contact with the rear surface of the front sprocket 120, and the rear sprocket 130 is positioned to be spaced apart from the front sprocket 120. The Rack gear 622 located at a position adjacent to the rear sprocket 130 (rear rack gear) is positioned to be engaged with the pinion gear 610 of the FPP 300 passing through the rear sprocket 130. The displacement roller (rear displacement roller) 712 is positioned to be out of the FPP 300.

Figure 24:
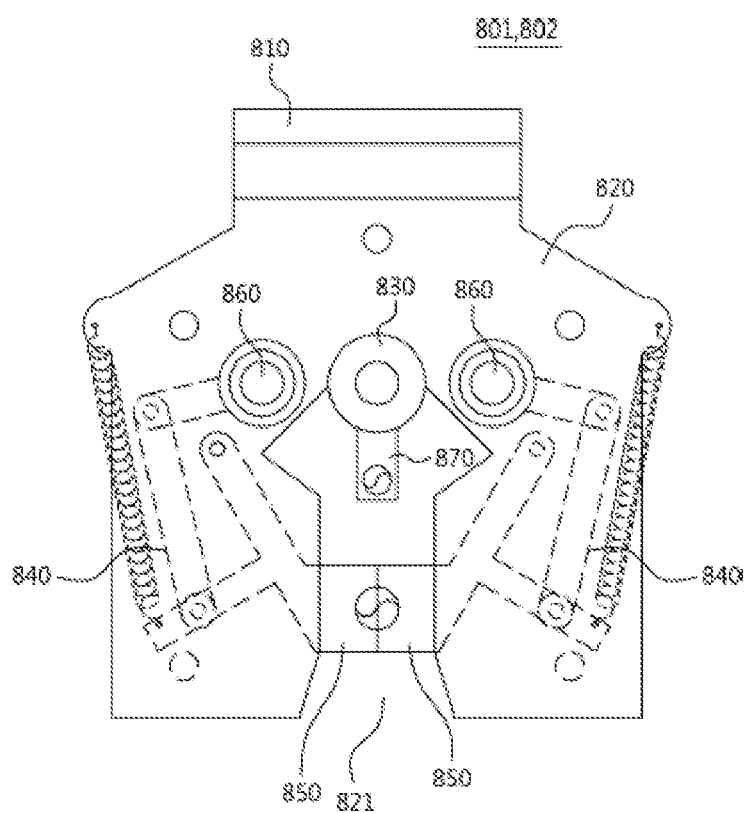
FIGS. 24 and 25 are diagrams to describe an embodiment of the switch operating process of the power plate.
Figure 25:
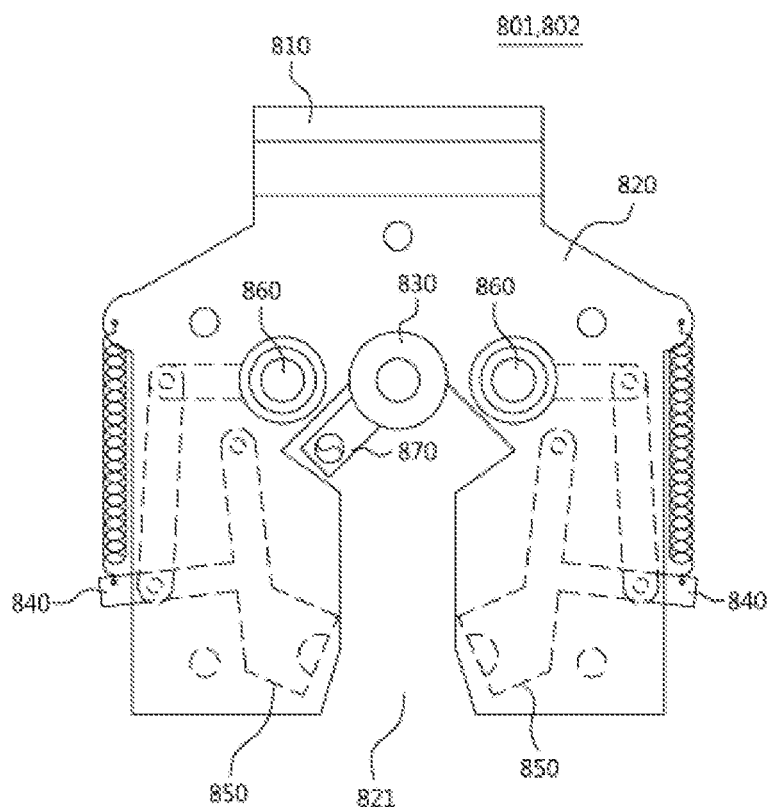

A switch unit 801 shown in FIG. 24 disposed on a guide rail 140 (a front switch portion) adjacent to the rear sprocket 130. A switch unit (rear switch portion) 802 is provided with a cutoff hole 821 for passing through the switch board 820 in an opened state and a front switch unit 801 and a rear switch unit 802.

Each FPP 300 that is moved from the DPB 200 to the rear sprocket 130 through the front sprocket 120 is moved in a raised state from the DPB 200. In the initial state as described above, Each FPP 300 moved to the font sprocket 120 moves from the DPB 200 to a tilting state.

As shown in the FIG. 6, the FPP 300 is in a released state in which the clutch jaw 331 formed on the outer pipe 330 is separated from the clutch jaw 231 formed on the inner shaft 230 of the DPB 200. Each FPP 300 is erected during the movement. However, due to the weight of the water flow and the FPP 300, the front end of the FPP 300 is maintained in a downward tilted state.

Particularly, the FPP 300 moved to the front sprocket 120 in the lying state is lifted due to contact with the forward displacement roller 711 while passing through the front sprocket 120. The outer pipe 330 of the FPP 300 is gradually rotated from the inner shaft 230 of the DPB 200 and the outer pipe 330 is rotated from the set angle (FPP is set up from the DPB). The operating switch 414 of the locking part 410 for pushing up is pressed against the switch bump 332 in the outer pipe 330 so that the compression springs 411. The clutch jaw 331 of the outer pipe 330 is engaged with the clutch jaw 231 of the inner shaft 230 while the outer pipe 330 is moved.

Thus, when the FPP 300 is completely passed through the front sprocket 120, the FPP 300 is locked in a standing state from the DPB 200.

The FPP 300 and the DPB 200 are moved to the rear sprocket 130 and the rear second release slope 524 positioned on the entry side (e.g., the bottom side in the FIG. 6) of the rear sprocket 130. The release bar 521 is abutted and gradually pressurized to operate the interlocking link 522.

The outer pipe 330 of the FPP 300, to which the interlocking link 522 is connected, is horizontally moved. Further, the clutch jaw 331 of the outer pipe 330 is coupled to the clutch jaw 231 of the inner pipe 230.

The rear rack gear 622 of the FPP 300 released from the DPB 200 meshes with the pinion gear 610 of the FPP 300.

And the rear rack gear 622 of the FPP 300 moves along the rear sprocket 130. The outer pipe 330 is forcibly rotated and the outer pipe 330 is rotated by a predetermined angle (for example, 90 degrees) in a state where the two clutch jaws 231, 331 are spaced from each other. The key 422 of the locking bar 421 is inserted into the key groove 232 of the inner shaft 230 to lock the FPP 300, so that the FPP 300 is not rotated.

Therefore, the FPP 300 is rotated 90 degrees from the DPB 200 until the rear sprocket 130 is completely passed, and the FPP 300 is held in a tilting state.

When the FPP 300 reaches the advancing side (e.g., the upper side in the FIG. 6) of the rear sprocket 130, the rear first release slope 514 located at the corresponding position releases the locking bar of the DPB 200. The key 422 is released from the key groove 232, thereby releasing the locking of the FPP 300.

In this state, the FPP 300 is inclined downward with respect to the outer pipe 330 coupled with the DPB 200 by its own weight and water flow, whereby the FPP 300 is moved in a direction opposite to the flow direction of the tidal current, so it is possible to smoothly carry out the movement.

Thus, the front sprockets 120 and the rear sprockets 130 are continuously rotated by the continuous movement of the chain 110 by repeating the above-described process. The rotational force of the sprockets 120, 130 is transmitted to the gear box in the nacelle 150, shifted by each of the transmission gears in the gear box, and then supplied to the generator to be converted into electric energy.

Meanwhile, when the direction of the tide is changed during the continuous power generation operation, the moving shaft 860 of each of the switch units 801, 802 is rotated by the electronic control so that the pushing bump 870 is inserted into the cut-off hole 821.

In the process of changing the flow of the tidal current, the temporarily stopped DPB 200 and FPP 300 are reversely moved from the right side to the left side in the FIG. 6 by the changed tidal current. In the process of this, the first bump 241 of the operation pointer 240 of the DPB 200 pushes the pushing bump 870 and forcibly moves the switch board 820. At this moment, when the pushing bump 870 is pushed, the rotation link 840 is interlocked, and the barrier 850 further intercepts the passage cut-off hole 821, and the second bump 242 of the operation pointer 240. By further pushing the barrier 850, the switch units 801, 802 can be stably moved.

When the switch units 801, 802 are moved, the rotation shaft 830 engaged with the rack plate 810 of the switch units 801, 802 is rotated by the rotation of the rotation shaft 830. And the forward second release slope 523 located on the advancing side (e.g., the lower side in the FIG. 6) of the front sprocket 120 are positioned at a predetermined position a rear second release slope 524 provided on the entry side (e.g., the lower side in the FIG. 6) of the rear sprocket 130. A rear second release slope 524 disposed on the advancing side (e.g., the upper side in the FIG. 6) of the rear sprocket 130. Thus, the first release slope 514 is positioned to be out of position.

The front rack gear 621 positioned to the front sprocket 120 is positioned to abut the pinion gear 610 of the FPP 300 passing through the front sprocket 120 and the forward displacement roller 711. And the rear rack gear 622 located at a position to the rear sprocket 130 is positioned at a position away from the FPP 300 passing through the front sprocket 120. The rear rack gear 622 and the rear displacement roller 712 are positioned so that the bottom surface of the FPP 300 is in contact with the pinion gear.

When the rack plate 810 of the front switch unit 801 and the rear switch unit 802 is moved by a predetermined distance after the moving shaft 860 is rotated. The pushing bump 870 and the barrier 850 are moved to the operation pointer. The front switch unit 801 and the rear switch unit 802 are connected to the front sprocket 120 and the front switch unit 801 and the rear switch unit 802.

The subsequent operation is the same as the generation operation by the above-described tidal current flowing from the left side to the right side.

Figure 26:
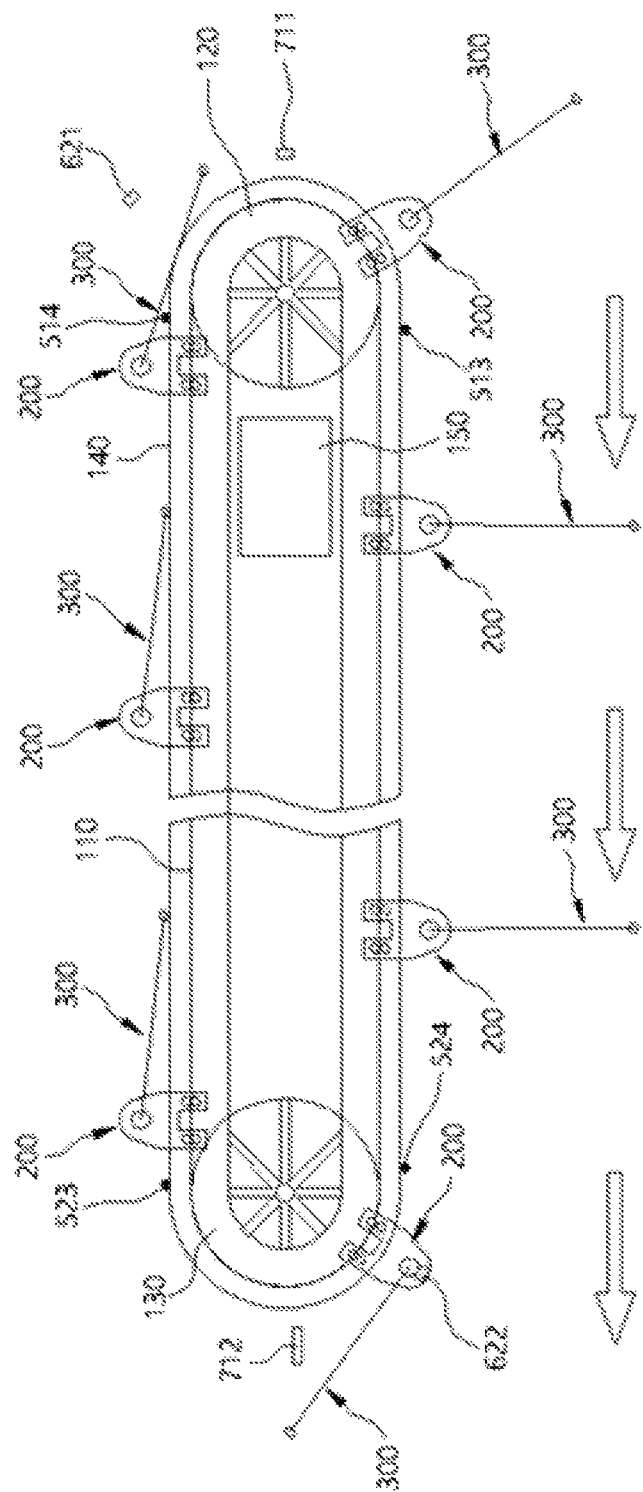
FIG. 26 is a schematic diagram to describe an operation of an exemplary embodiment of a tidal current power generator when reverse water flow occurrence.

FIG. 26 is a schematic diagram to describe an operation of an exemplary embodiment of a tidal current power generator when reverse water flow occurrence.

As shown in the attached FIG. 26, each FPP 300, which is moved to the rear sprocket 130 through the front sprocket 120 in a locking state, is changed in a tilting state from the DPB 200 in a tilting state and is moved to the front sprocket 120 through the rear sprocket 130.

Thus, the tidal current power generation device of the present invention is provided with the influence of the tidal current completely, since the FPP 300 is moved in a state in which the FPP 300 is tilted down or moved in a lifting (standing) state per the flow of tidal current.

Particularly, even when the flow of the tidal current is changed, the tidal current power generation device of the present invention can perform the same power generation as the previous (opposite) flow of the tidal current, thereby obtaining more excellent power generation efficiency.

Further, since the FPP 300 passes through the sprockets 120, 130 due to the provision of the locking part and the releasing part, the tidal current power generator of the present invention passes through the respective sprockets 120, 130 while maintaining a state in which accurate state switching is performed. Also, the damage of the FPP 300 is prevented.

In addition, since the tidal current power generator of the present invention operates in a mechanical structure other than the control for operating the switch units 801, 802 when the direction of the tidal current is changed. It is possible to minimize the occurrence of errors in the power generation operation.

According to the exemplary embodiments, the tidal generator of this invention has the effect of being able to fully deliver forces generated by water flows because FPPs are operated by maintaining tilting or standing state among water flows.

Particularly, the tidal current generator of this invention is able to generate electricity through changing its operating direction among water flow direction, thus the tidal current generator of this invention enable to achieve maximum efficiency of electric power generation.

Further, as the tidal current generator of the present invention contains locking and release parts as components of generator device, thus FPP change its operating state accurately. As a result, FPP damage preventing effect is also expected. Further, as the tidal current generator of this invention operates among mechanical structure except operating a switch part to when change water flow direction, operating malfunction can be minimized. Therefore, the tidal current generator of this invention is appropriate as an underwater structure.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements.

What is claimed is:

1. A tidal current power generator comprising:
a main frame including first and second sprockets rotated together with a chain and a guide rail for supporting the chain, the main frame being arranged in parallel with the direction of the tidal current of seawater;
a plurality of operating bodies mounted on the chain and guided by the guide rails, each of the plurality of operating bodies including an inner shaft projecting to both sides of the outer surface and an outer pipe accommodating the inner shaft;
a plurality of power plates combined with the outer pipe configured to forcibly move the plurality of operating bodies in the direction of the tidal current by the force of the tidal current;
a pair of clutch jaws engaged with or spaced from each other by axial movement of the outer pipe;
a locking part comprising a lifting locking part to force the outer pipe to move to the inner shaft by rotation of the outer pipe so that each of the clutch jaws are engaged with each other; and
a release part comprising a first release part and a second release part, the release part configured to move the outer pipe so that each of the clutch jaws are spaced apart from each other
wherein the first release part has a first release slope configured to separate the clutch jaw provided in the outer pipe of the power plate from the clutch jaw provided in the inner shaft of the operating body during the passage of the first sprocket while the power plate is erected, and
the second release part having a release bar, an interlocking link, and a second release slope, the second release part configured to separate the clutch jaw provided in the outer pipe of the power plate, which is locked while passing through the first sprocket, from the clutch jaw provided on the inner shaft of the operating body,
wherein the plurality of power plates are erected so as to be perpendicular to the direction of the tidal current when passing the first sprocket and the plurality of power plates are laid down so as to be parallel to the direction of the tidal current when passing the second sprocket.

2. The tidal current power generator of claim 1, wherein each of the plurality of operating bodies comprises a fixed part as a body member and a bending part bent at both sides of the fixed part, the bent parts includes a guide hole for receiving an end portion of the guide rails.

3. The tidal current power generator of claim 2, wherein each of the plurality of operating bodies further comprises guide rollers, which rotate in contact with the upper and lower surfaces of the guide rails.

4. The tidal current power generator of claim 1, wherein the lifting locking part comprises a plurality of stage parts having compression springs having different elastic modulus, the plurality of stage parts are configured to lock the power plates in an erecting state by a restoring operation of the sequential compression springs.

5. The tidal current power generator of claim 4, wherein a switch bump is formed on the inner circumferential surface of the outer pipe, and an operation switch is provided in a first stage part of the plurality of stage parts, and when the operation switch is pressed against the switch bump, the compression springs of the respective stages are sequentially restored.

6. The tidal current power generator of claim 4, wherein the compression spring provided in a last stage part of the plurality of stage parts has a greater restoring force than the compression springs provided in the other stage parts.

7. The tidal current power generator of claim 1, wherein a key groove is formed on an outer circumferential surface of the inner shaft, and
wherein the locking part comprises a tilting lock part including a locking bar sequentially passing through the operating body and the outer pipe and a key protruded from an outer circumferential surface of the locking bar, the key is accommodated in the key groove of the inner shaft by a rotation operation of the outer pipe.

8. The tidal current power generator of claim 7, wherein the first release slope positioned and tilted in the moving direction of the locking bar, and
wherein the locking bar is gradually pressed by the first release slope when the operating body passes the first release slope, so that the key is released from the key groove of the inner shaft.

9. The tidal current power generator of claim 7, wherein:
the release bar is installed to penetrate the operating body,
the interlocking link is configured to push the outer pipe so that the clutch jaw of the outer pipe is separated from the clutch jaw of the inner shaft while being pressed by a lowering action of the release bar, and
the second release slope is formed at an oblique position of the guide rail and located on the moving direction side of the operating body to press the release bar of the operating body passing through the guide rails.

10. The tidal current power generator of claim 1, further comprising:
a displacement roller provided on the guide rail for guiding the power plates to be forcibly raised while the bottom surface of the power plates passing through the first or second sprocket is in contact with the guide rail.

11. The tidal current power generator of claim 1, further comprising:
a pinion gear provided on an outer peripheral surface of the outer pipe, and
rack gears for forcibly rotating the pinion gear while being positioned at a position where the pinion gear passes.

12. The tidal current power generator of claim 11, wherein the rack gears are provided for each of the first and second sprockets, and when one of the rack gears is moved downward, the other rack gear is moved upwards.

13. The tidal current power generator of claim 12, wherein the guide rail includes a switch unit for moving the two rack gears in opposite directions in accordance with the flow direction of the tidal current.

14. The tidal current power generator of claim 13, wherein each of the plurality of operating bodies includes an operating pointer to operate the switch unit,
wherein the switch unit comprises:
a switch board mounted on the guide rail and including a cut-off hole for passing through which the operation pointer passes,
rotating shafts installed on both sides of the cut-off hole of the switch board,
a rotation link coupled to each of the rotating shafts and rotated by the axial movement of the rotating shafts, a barrier provided on each of the opposing faces of the rotation links, and a moving shaft for rotating the respective rotating shafts while being pressed in the moving direction of the operating body.

15. The tidal current power generator of claim 14, wherein the operation pointer includes a first bump for forcibly pushing the moving shaft to rotate each rotating link and a second bump for pushing the barrier.

16. The tidal current power generator of claim 15, wherein a pushing bump is formed on a peripheral surface of the moving shaft, and the moving shaft is rotated every time the direction of the tidal current is changed so that the pushing bump is positioned on the moving direction side of the first bump.

* * * * *